United States Patent
Kondo et al.

(10) Patent No.: US 8,358,862 B2
(45) Date of Patent: Jan. 22, 2013

(54) IMAGE SIGNAL PROCESSING APPARATUS, IMAGE SIGNAL PROCESSING METHOD, PREDICTION COEFFICIENT GENERATING APPARATUS, PREDICTION COEFFICIENT GENERATING METHOD, AND PROGRAMS FOR CAUSING COMPUTER TO EXECUTE THE METHODS

(75) Inventors: Tetsujiro Kondo, Tokyo (JP); Sakon Yamamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 927 days.

(21) Appl. No.: 12/437,967

(22) Filed: May 8, 2009

(65) Prior Publication Data

US 2009/0290804 A1 Nov. 26, 2009

(30) Foreign Application Priority Data

May 20, 2008 (JP) ................. 2008-132309

(51) Int. Cl.
- *G06K 9/32* (2006.01)
- *G06K 9/46* (2006.01)
- *H04N 7/12* (2006.01)
- *H04N 11/02* (2006.01)
- *H04N 11/04* (2006.01)

(52) U.S. Cl. ........ 382/239; 382/232; 382/233; 382/238; 382/248; 382/250; 375/240.12; 375/240.18

(58) Field of Classification Search .......... 382/232, 382/233, 238, 239, 248, 250, 299; 375/240.12, 375/240.18
See application file for complete search history.

(56) References Cited

U.S. PATENT DOCUMENTS

| | | | | |
|---|---|---|---|---|
| 6,442,207 | B1 * | 8/2002 | Nishikawa et al. | 375/240.26 |
| 6,912,253 | B1 * | 6/2005 | Li et al. | 375/240.12 |
| 7,082,220 | B2 * | 7/2006 | Kondo et al. | 382/238 |
| 7,283,678 | B2 * | 10/2007 | Kondo et al. | 382/250 |
| 2010/0086225 | A1 * | 4/2010 | Yachida | 382/239 |

FOREIGN PATENT DOCUMENTS

| | | |
|---|---|---|
| JP | 6-217111 | 8/1994 |
| JP | 9-331526 | 12/1997 |
| JP | 2002-223167 | 8/2002 |
| JP | 2002-335405 | 11/2002 |
| JP | 2004-56461 | 2/2004 |
| JP | 2004-304575 | 10/2004 |
| JP | 2006-121131 | 5/2006 |

* cited by examiner

*Primary Examiner* — Matthew Bella
*Assistant Examiner* — Jose M Torres
(74) *Attorney, Agent, or Firm* — Oblon, Spivak, McClelland, Maier & Neustadt, L.L.P.

(57) ABSTRACT

An image signal processing apparatus includes: a block division unit inputting an image signal encoded by orthogonal transformation and dividing the image signal into second blocks different from first blocks encoded using the orthogonal transformation; an activity calculation unit calculating an activity of each second block; a re-encoding unit encoding the second blocks using the orthogonal transformation; a re-encoded difference calculation unit calculating difference values between the second blocks and the first blocks; a class determination unit determining a class of each second block on the basis of a distribution of the difference value and the activity; a prediction coefficient generating unit generating a prediction coefficient corresponding to each class; a prediction tap construction unit constructing a prediction tap for calculating a target pixel in each second block; and a predictive operation unit operating the prediction tap and the prediction coefficient to calculate a pixel value of each target pixel.

10 Claims, 25 Drawing Sheets

IMAGE SIGNAL PROCESSING APPARATUS, IMAGE SIGNAL PROCESSING METHOD, PREDICTION COEFFICIENT GENERATING APPARATUS, PREDICTION COEFFICIENT GENERATING METHOD, AND PROGRAMS FOR CAUSING COMPUTER TO EXECUTE THE METHODS

BACKGROUND OF THE INVENTION

1. Field of the Invention

The invention relates to an image signal processing apparatus, image signal processing method, prediction coefficient generating apparatus, prediction coefficient generating method, and programs for causing a computer to execute the methods, which use orthogonal transformation for encoding. Specifically, the invention marks the degree of degradation of a block on the basis of a difference when re-encoded and an activity of the block to make it possible to appropriately remove distortion in accordance with the degree of degradation of the block.

2. Description of the Related Art

In recent years, a discrete cosine transform (DCT) is widely used in JPEG, MPEG, and the like, as encoding that uses orthogonal transformation. Distortion caused by the above encoding generally includes block distortion in which a step between adjacent blocks is apparent or mosquito noise that tends to occur around an edge. To remove such distortion, a low-pass filter is, for example, applied to portions that appear to be block distortion or mosquito noise to remove the distortion.

However, distortion removal may possibly be applied to an edge portion having no block distortion or a detail that is not mosquito noise, resulting in degradation of image quality. To solve the above problem, for example, Japanese Unexamined Patent Application Publication No. 9-331526 describes a technique that average value data of a target block and adjacent blocks are used as a class code to separate blocks containing an edge or a detail from blocks in which block distortion tends to occur. Thus, it is possible to execute processes suitable for the respective blocks. In addition, Japanese Unexamined Patent Application Publication No. 2006-121131 describes a technique that it is checked for an isolated coefficient value at a predetermined position of DCT coefficients to detect a mosquito noise portion.

SUMMARY OF THE INVENTION

Incidentally, in Japanese Unexamined Patent Application Publication No. 9-331526 according to a related art, blocks containing an edge or a detail are separated from blocks in which block distortion tends to occur. However, there is a problem that, unless separation is appropriately carried out, degradation occurs.

In addition, in Japanese Unexamined Patent Application Publication No. 2006-121131, a mosquito noise portion is detected by checking for an isolated coefficient value. However, mosquito noise also occurs at a portion of which the coefficient value is not isolated. Thus, noise removal performance may possibly be insufficient.

It is desirable to provide an image signal processing apparatus, image signal processing method, prediction coefficient generating apparatus, prediction coefficient generating method, and programs for causing a computer to execute the methods, which are able to appropriately remove distortion in accordance with the degree of degradation of a block.

According to an embodiment of the invention, an image signal processing apparatus includes: a block division unit that inputs an image signal encoded by orthogonal transformation and that divides the encoded image signal into second blocks different from first blocks encoded using the orthogonal transformation; an activity calculation unit that calculates an activity of each of the second blocks divided by the block division unit; a re-encoding unit that encodes the second blocks divided by the block division unit using the orthogonal transformation; a re-encoded difference calculation unit that calculates difference values between the second blocks re-encoded by the re-encoding unit and the first blocks encoded using the orthogonal transformation; a class determination unit that determines a class of each of the second blocks on the basis of a distribution of the difference value calculated by the re-encoded difference calculation unit and the activity calculated by the activity calculation unit; a prediction coefficient generating unit that generates a prediction coefficient corresponding to each of the classes determined by the class determination unit; a prediction tap construction unit that constructs a prediction tap for calculating a target pixel in each of the second blocks; and a predictive operation unit that operates the prediction tap constructed by the prediction tap construction unit and the prediction coefficient generated by the prediction coefficient generating unit to calculate a pixel value of each of the target pixels.

With the image signal processing apparatus according to the embodiment of the invention, the block division unit inputs an image signal encoded by orthogonal transformation, and divides the encoded image signal into second blocks different from first blocks encoded using the orthogonal transformation. The activity calculation unit calculates an activity of each of the second blocks divided by the block division unit. The re-encoding unit encodes the second blocks divided by the block division unit using the orthogonal transformation. The re-encoded difference calculation unit calculates difference values between the second blocks re-encoded by the re-encoding unit and the first blocks encoded using the orthogonal transformation.

The class determination unit determines a class of each of the second blocks on the basis of a distribution of the difference value calculated by the re-encoded difference calculation unit and the activity calculated by the activity calculation unit. For example, the class determination unit may include: a vector data conversion unit that generates vector data formed of the difference value calculated by the re-encoded difference calculation unit and the activity calculated by the activity calculation unit, a class code storage unit that stores pieces of typical vector data, each of which represents the difference value calculated by the re-encoded difference calculation unit and the activity calculated by the activity calculation unit; and a minimum value determination unit that determines typical vector data having a minimum norm to the vector data generated by the vector data conversion unit from among the pieces of typical vector data stored in the class code storage unit. Thus, it is possible to appropriately remove distortion in accordance with the degree of degradation of a block. For example, it is possible to separate portions, at which mosquito noise occurs, from detail portions. Thus, it is possible to remove distortion by removing mosquito noise but not removing a detail.

According to another embodiment of the invention, an image signal processing method includes the steps of: dividing an image signal into first blocks and then encoding the image signal using orthogonal transformation; dividing the encoded image signal into second blocks different from the first blocks; calculating an activity of each of the divided second blocks; re-encoding the second blocks using the orthogonal transformation; calculating difference values between the re-encoded second blocks and the first blocks encoded using the orthogonal transformation; determining a class of each of the second blocks on the basis of a distribution of the calculated difference value and the activity; generating a prediction coefficient corresponding to the determined class; constructing a prediction tap for calculating a target pixel in each of the second blocks; and operating the constructed prediction tap and the prediction coefficient to calculate a pixel value of the target pixel. In addition, according to an embodiment of the invention, a program causes a computer to execute the above image signal processing method.

According to further another embodiment of the invention, a prediction coefficient generating apparatus includes: an encoding unit that encodes an image signal divided into first blocks using orthogonal transformation; a decoding unit that decodes the image signal encoded by the encoding unit; a block division unit that inputs the image signal decoded using the orthogonal transformation and that divides the encoded image signal into second blocks different from the first blocks encoded using the orthogonal transformation; an activity calculation unit that calculates an activity of each of the second blocks divided by the block division unit; a re-encoding unit that encodes the second blocks divided by the block division unit using the orthogonal transformation; a re-encoded difference calculation unit that calculates difference values between the second blocks re-encoded by the re-encoding unit and the first blocks encoded using the orthogonal transformation; a class determination unit that determines a class of each of the second blocks on the basis of a distribution of the difference value calculated by the re-encoded difference calculation unit and the activity calculated by the activity calculation unit; a prediction tap construction unit that constructs a prediction tap for calculating a target pixel in each of the second blocks; and a prediction coefficient operation unit that, for each position of a target pixel of each second block in the class, calculates a prediction coefficient that minimizes a difference between a pixel value of the target pixel and a pixel value of the corresponding first block on the basis of the class determined by the class determination unit, the prediction tap constructed by the prediction tap construction unit and pixels of the image signal divided into that first block.

With the prediction coefficient generating apparatus according to the embodiment of the invention, the encoding unit encodes an image signal, which is divided into first blocks, using orthogonal transformation. The decoding unit decodes the image signal encoded by the encoding unit. The block division unit inputs the image signal decoded using the orthogonal transformation and divides the encoded image signal into second blocks different from the first blocks encoded using the orthogonal transformation. The activity calculation unit calculates an activity of each of the second blocks divided by the block division unit. The re-encoding unit encodes the second blocks divided by the block division unit using the orthogonal transformation. The re-encoded difference calculation unit calculates difference values between the second blocks re-encoded by the re-encoding unit and the first blocks encoded using the orthogonal transformation. The class determination unit determines a class of each of the second blocks on the basis of a distribution of the difference value calculated by the re-encoded difference calculation unit and the activity calculated by the activity calculation unit. The prediction tap construction unit constructs a prediction tap for calculating a target pixel in each of the second blocks. The prediction coefficient operation unit, for each position of a target pixel of each second block in the class, calculates a prediction coefficient that minimizes a difference between a pixel value of the target pixel and a pixel value of the corresponding first block on the basis of the class determined by the class determination unit, the prediction tap constructed by the prediction tap construction unit and pixels of the image signal divided into that first block.

With the above configuration, it is possible to provide a prediction coefficient for appropriately performing distortion removal in accordance with the degree of degradation of a block. By using the prediction coefficient to perform predictive operation, for example, it is possible to separate portions, at which mosquito noise occurs, from detail portions. Thus, it is possible to remove distortion by removing mosquito noise but not removing a detail.

According to further another embodiment of the invention, a prediction coefficient generating method includes the steps of: dividing an image signal into first blocks and then encoding the image signal using orthogonal transformation; decoding the encoded image signal; inputting the image signal encoded using the orthogonal transformation and dividing the encoded image signal into second blocks different from the first blocks; calculating an activity of each of the divided second blocks; re-encoding the second blocks using the orthogonal transformation; calculating difference values between the re-encoded second blocks and the first blocks encoded using the orthogonal transformation; determining a class of each of the second blocks on the basis of a distribution of the calculated difference value and the activity; constructing a prediction tap for calculating a target pixel in each of the second blocks; for each position of the target pixel of each second block in the class, calculating a prediction coefficient that minimizes a difference between a pixel value of the target pixel and a pixel value of the corresponding first block on the basis of the class, the prediction tap and pixels of the image signal divided into that first block. In addition, according to an embodiment of the invention, a program causes a computer to execute the above prediction coefficient generating method.

DESCRIPTION OF THE PREFERRED EMBODIMENTS

Figure 1:
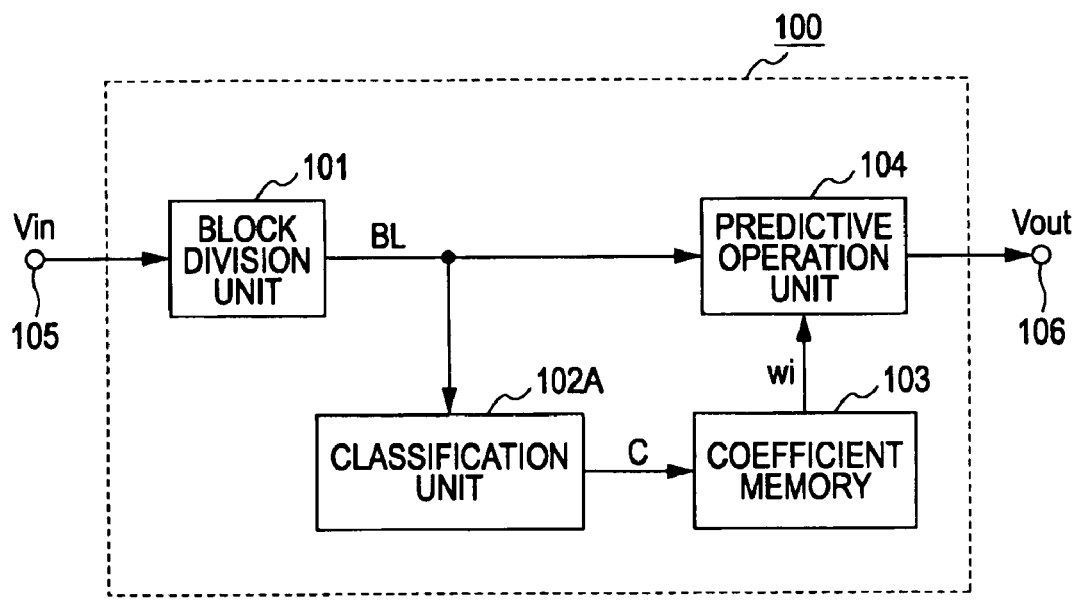
FIG. 1 is a block diagram that shows an example of the configuration of an image processing apparatus according to a first embodiment of the invention.

Hereinafter, an image signal processing apparatus, image signal processing method, prediction coefficient generating apparatus, prediction coefficient generating method, and programs for causing a computer to execute the methods according to embodiments of the invention will be described with reference to the accompanying drawings. Note that in the following description, an input image signal is encoded by means of discrete cosine transform (DCT). FIG. 1 is a block diagram that shows an example of the configuration of an image processing apparatus 100 according to an embodiment of the invention. The image processing apparatus 100 shown in FIG. 1 marks the degree of degradation of a block on the basis of a difference when re-encoded. The DCT has such a property that, because of the characteristic of encoding, when a once-encoded signal is shifted in phase and then re-encoded, degradation after re-encoding occurs in accordance with the original degree of degradation.

The image processing apparatus 100 includes a block division unit 101, a classification unit 102A, a coefficient memory 103 and a predictive operation unit 104. The block division unit 101 inputs an image signal Vin from an input terminal 105. The image signal Vin is an image signal that has been encoded only once by DCT. The block division unit 101 divides the input image signal Vin into blocks BL at positions different from blocks processed by DCT for the input image signal Vin. Note that the blocks BL are examples of second blocks.

Figure 2:
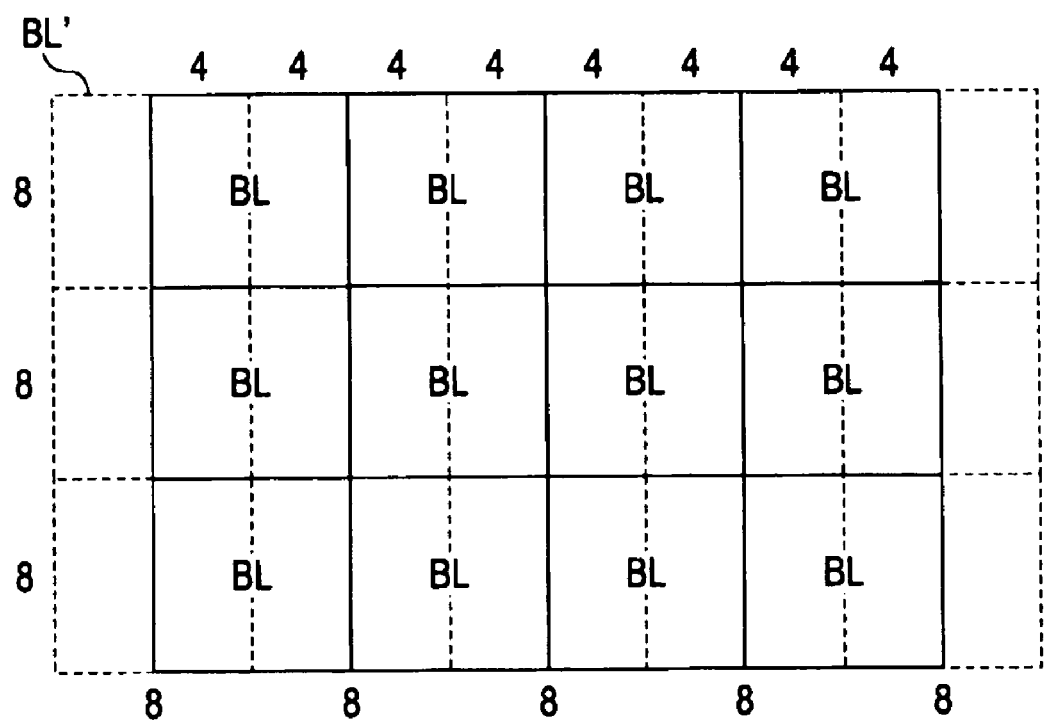
FIG. 2 is a conceptual view that shows an example of the operation of a block division unit.

For example, FIG. 2 is a conceptual view that shows an example of an operation of the block division unit 101. 8×8 blocks BL' indicated by broken line in FIG. 2 are examples of first blocks, and are blocks processed by DCT for the image signal Vin input from the input terminal 105. 8×8 blocks BL indicated by solid line in FIG. 2 are blocks into which the block division unit 101 divides the image signal Vin at positions that are shifted horizontally by four pixels from the blocks BL'. In this way, the block division unit 101 divides the image signal Vin into the blocks BL at positions different from the blocks BL' processed by DCT for the input image signal Vin.

Referring back to FIG. 1, the blocks BL divided by the block division unit 101 are output to the classification unit 102A and the predictive operation unit 104. The classification unit 102A obtains a class from each block BL.

Figure 3:
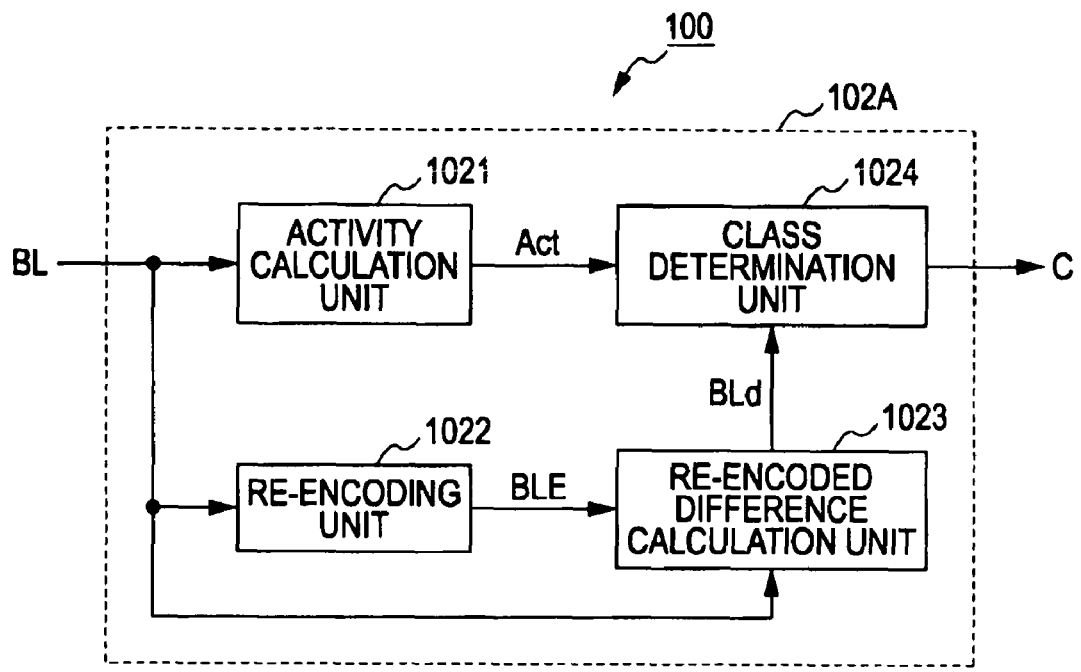
FIG. 3 is a block diagram that shows an example of the configuration of a classification unit according to the first embodiment.

For example, FIG. 3 is a block diagram that shows an example of the configuration of the classification unit 102A. The classification unit 102A shown in FIG. 3 includes an activity calculation unit 1021, a re-encoding unit 1022, a re-encoded difference calculation unit 1023 and a class determination unit 1024. The blocks BL are output to the activity calculation unit 1021, the re-encoding unit 1022 and the re-encoded difference calculation unit 1023.

The activity calculation unit 1021 calculates an activity of each block BL. For example, calculation of an activity uses, with respect to a target pixel $P_{i,j}$, a pixel $P_{i+1,j}$ that is horizontally adjacent by +1 pixel, a pixel $P_{i-1,j}$ that is horizontally adjacent by −1 pixel, a pixel $P_{i,j+1}$ that is vertically adjacent by +1 pixel and a pixel $P_{i,j-1}$ that is vertically adjacent by −1 pixel. Then, an activity is calculated by the following mathematical expression (1).

[Expression 1]

$$Act_{i,j} = |4P_{i,j} - P_{i+1,j} - P_{i-1,j} - P_{i,j+1} - P_{i,j-1}| \qquad (1)$$

Calculation of the mathematical expression (1) is carried out on all the pixels in a block BL, and a value obtained by the following mathematical expression (2), which is the sum of the results of the above calculation, is output as the activity Act of that block BL. In this way, the activity calculation unit 1021 shown in FIG. 3 obtains an activity Act of each block BL.

[Expression 2]

$$Act = \sum_{i=1}^{8} \sum_{j=1}^{8} Act_{i,j} \quad (2)$$

Figure 4:
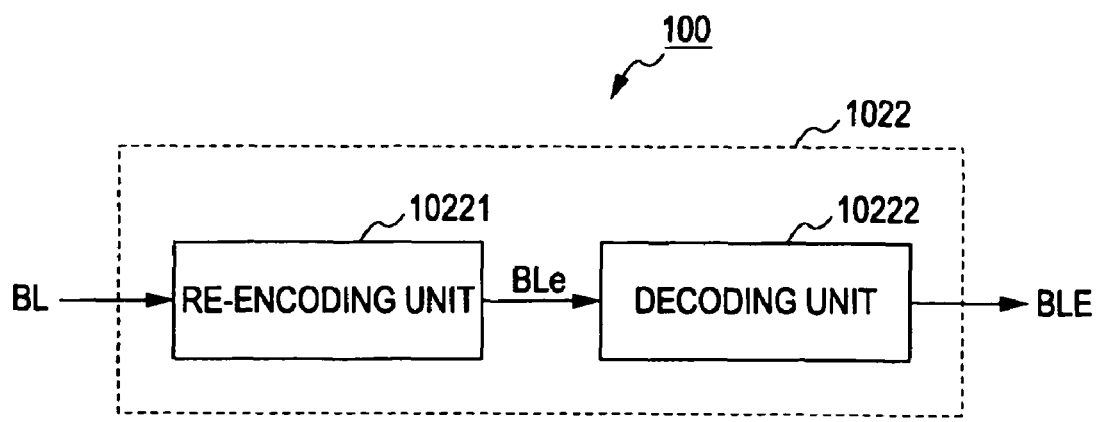
FIG. 4 is a block diagram that shows an example of the configuration of a re-encoding unit.

Next, the re-encoding unit 1022 shown in FIG. 3 will be described. FIG. 4 is a block diagram that shows an example of the configuration of the re-encoding unit 1022. The re-encoding unit 1022 shown in FIG. 4 includes an re-encoding unit 10221 and a decoding unit 10222. The re-encoding unit 10221 encodes input blocks BL by DCT and outputs an encoded signal BLe. Here, quantization by encoding may be carried out by selected quantization as long as an input signal is reduced to a certain degree. Here, quantization of which the Q value of DCT is 50 is carried out as an example. The decoding unit 10222 decodes the encoded signal BLe. Then, the decoding unit 10222 outputs the decoded signal as re-encoded (encoded twice) blocks BLE.

The re-encoded difference calculation unit 1023 shown in FIG. 3 inputs the blocks BL and the blocks BLE. Here, the blocks BL are blocks that have been encoded once. In addition, the blocks BLE are blocks that the blocks BL have been re-encoded by the re-encoding unit 1022. The re-encoded difference calculation unit 1023 calculates the sum of absolute differences BLd between the block BL and the block BLE (hereinafter, simply referred to as a difference BLd where appropriate). Calculation of the difference uses the following mathematical expression (3) using a corresponding pixel $PE_{i,j}$ located at the same pixel position in a block BLE for a target pixel $P_{i,j}$ of a block BL.

[Expression 3]

$$BLd = \sum_{i=1}^{8} \sum_{j=1}^{8} |P_{i,j} - PE_{i,j}| \quad (3)$$

The DCT has such a property that, because of the characteristic of encoding, when a once-encoded signal is shifted in phase and then re-encoded, degradation after re-encoding occurs in accordance with the original degree of degradation. Using the above property, the degree of degradation of a block is marked on the basis of a difference BLd when re-encoded.

Figures 5, 6:
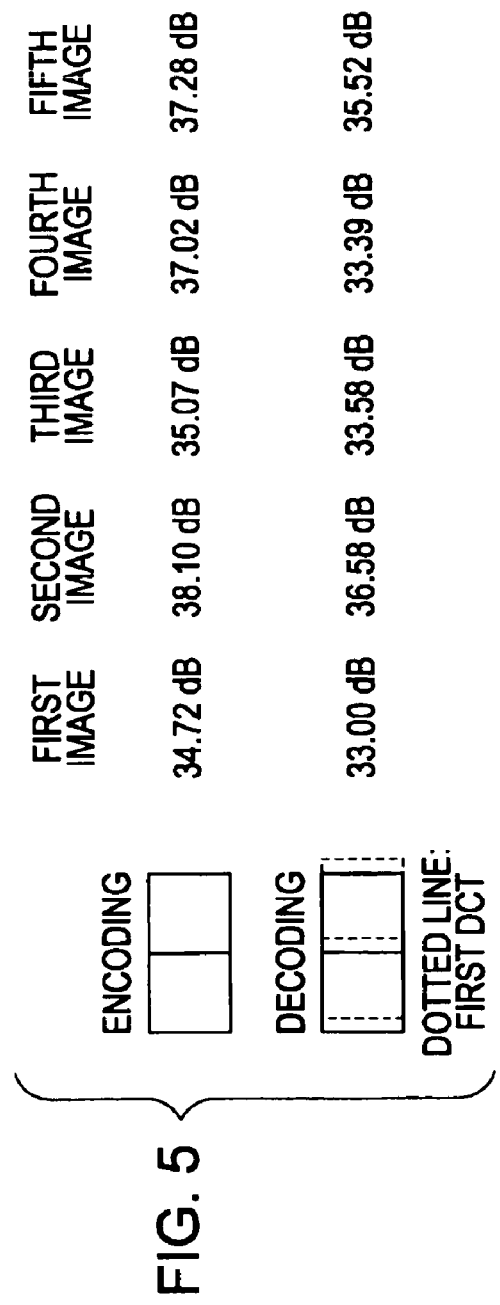
FIG. 5 is a view that illustrates an example of an SN ratio indicating the degree of degradation of a block.
FIG. 6 is a view that illustrates an example of an SN ratio indicating the degree of degradation of a block when the amount of phase shift is changed.

FIG. 5 is a view that illustrates an example of an SN ratio indicating the degree of degradation of a block. The results shown at the upper row in FIG. 5 show SN ratios between original first image to fifth image and first image to fifth image that are encoded by DCT from unencoded, original first image to fifth image.

In addition, the results shown at the lower row in FIG. 5 show SN ratios between original first image to fifth image and first image to fifth image that are shifted horizontally by one pixel and re-encoded by DCT from once-encoded first image to fifth image. For example, the SN ratio in encoding of the first image is "34.72 dB". In contrast, the SN ratio in re-encoding of the first image is "33.00 dB". In this way, the SN ratio in re-encoding of the first image is lower than the SN ratio in encoding of the first image. Thus, it appears that, when a signal is once encoded, shifted in phase and then re-encoded, degradation occurs. In addition, similar results are shown in regard to the second image to the fifth image. Note that in this example, quantization of DCT uses 60 as the Q value.

FIG. 6 is a view that illustrates an example of an SN ratio indicating the degree of degradation of a block when the amount of phase shift is changed. In this example, an SN ratio between an original fourth image shown in FIG. 5 and a re-encoded fourth image when the amount of phase shift is changed. For example, when the horizontal phase shift amount and the vertical phase shift amount shown in FIG. 6 are 0, the SN ratio in re-encoding is the same value "37.02 dB" as the SN ratio at the time when DCT is performed on the original image. That is, in a state where no phase shift occurs, the SN ratio remains unchanged in re-encoding.

In contrast, when the horizontal phase shift amount is 1 to 4 and/or when the vertical phase shift amount is 1 to 4, the SN ratios are decreased and, therefore, re-encoding causes degradation. Incidentally, when the horizontal and vertical phase shift amounts are 1 to 4, the amounts of degradation are substantially equal among the phase shift amounts 1 to 4. Thus, it appears that, even in any phase shift amounts, an SN ratio with respect to an original image is substantially the same.

Figure 7A:
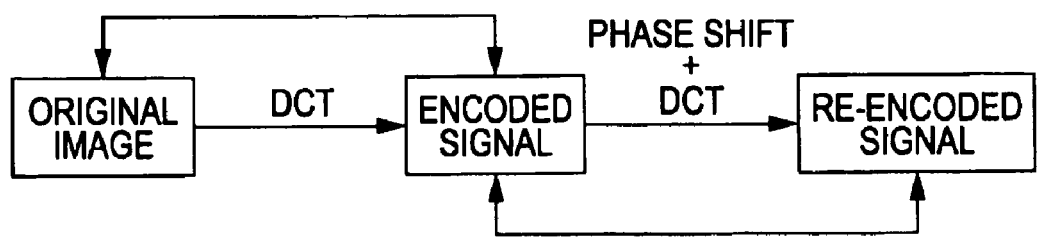
FIG. 7A and FIG. 7B are views that illustrate the relationship between a difference between an encoded signal and a re-encoded signal and a difference between an original image and an encoded signal.

Next, the relationship between an encoded signal that is encoded by DCT from an original image and a re-encoded signal that is re-encoded by DCT from the encoded signal of which the phase is shifted will be described. FIG. 7A is a schematic diagram that shows the relationship between an encoded signal and a re-encoded signal. As shown in FIG. 7A, an original image is encoded by DCT to generate an encoded signal. Then, the encoded signal is encoded by DCT to generate a re-encoded signal. Note that in this example, quantization of DCT to the original image uses 75 as the Q value, phase shift amount is one pixel in the horizontal direction, and quantization of DCT to the encoded signal uses 50 as the Q value.

Figure 7B:
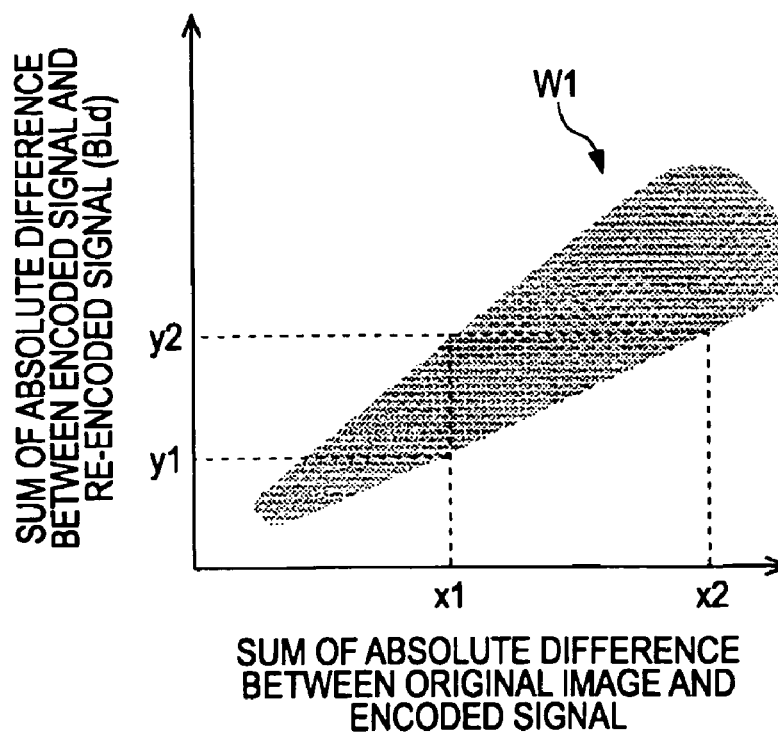

FIG. 7B is a view that shows the relationship between a sum of absolute differences between an original image and an encoded signal and a sum of absolute differences BLd between an encoded signal and a re-encoded signal. In FIG. 7B, the abscissa axis represents a sum of absolute differences between an original image and an encoded signal, and the ordinate axis represents a sum of absolute differences BLd between an encoded signal and a re-encoded signal.

FIG. 7B shows a distribution of plotted points as a simplified region W1 on the basis of analyzed data that plot a value of a sum of absolute differences between an original image and an encoded signal and a value of a sum of absolute differences between an encoded signal and a re-encoded signal in regard to all blocks that are shifted in phase from an encoded signal. According to FIG. 7B, an upward-sloping proportional relationship is present between a sum of absolute differences between an original image and an encoded signal and a sum of absolute differences between an encoded signal and a re-encoded signal.

Thus, as the sum of absolute differences between an original image and an encoded image increases, the sum of absolute differences between an encoded signal and a re-encoded signal also increases. Thus, it appears that, as distortion of an encoded signal increases, distortion of a phase-shifted and re-encoded signal tends to increase.

However, in FIG. 7B, even when the sum of absolute differences between an original image and an encoded signal is the same, the sum of absolute differences between an encoded signal and a re-encoded signal differs at some portions. For example, in regard to a value x1 of the sum of absolute differences between an original image and an encoded signal shown in FIG. 7B, the sum of absolute differences BLd between an encoded signal and a re-encoded signal has a range between y1 and y2. This depends on whether the waveform in a block when re-encoded includes a high-frequency component even when the sum of absolute differences between an original image and an encoded signal is the same. Generally, when a block includes a high-frequency component, a difference between an encoded signal and a re-encoded signal increases because of the influence of a high-frequency component in the block when re-encoded. For example, when the value of the difference BLd is y1 with respect to the value x1 shown in FIG. 7B, the waveform in the block includes almost no high-frequency component. In addition, when the value of the difference BLd is y2 with respect to the value x1, the waveform in the block includes a high-frequency component.

In this way, even when the sum of absolute differences between an original image and an encoded signal is the same x1, the value of the sum of absolute differences between an encoded signal and a re-encoded signal ranges from y1 to y2 depending on a high-frequency component included in a block.

In addition, the image processing apparatus 100 according to the embodiment of the invention removes distortion by inputting an encoded image signal Din, so the sum of absolute differences between an original image and an encoded signal shown in FIG. 7B is not obtained. Thus, only with the sum of absolute differences BLd between an encoded signal and a re-encoded signal, a difference from an original image is not obtained. For example, only with the value y2 of the sum of absolute differences BLd between an encoded signal and a re-encoded signal, it is not apparent whether it is a block of which the difference from an original image is small (value x1) but the difference from a re-encoded signal is large because of the influence of a high-frequency component in the block when re-encoded. In addition, only with the value y2, it is not apparent whether a block has a large difference from an original image (value x2) and also has a large difference from a re-encoded signal, thus making it difficult to determine whether it is influenced by a high-frequency component.

Thus, at the time of re-encoding, it may also be necessary to prepare an index indicating how much degradation tends to occur. In the embodiment of the invention, an activity Act of a block calculated by the activity calculation unit 1021 shown in FIG. 3 is used as an index, and specifically, the above described mathematical expressions (1) and (2) are used.

Figure 8:
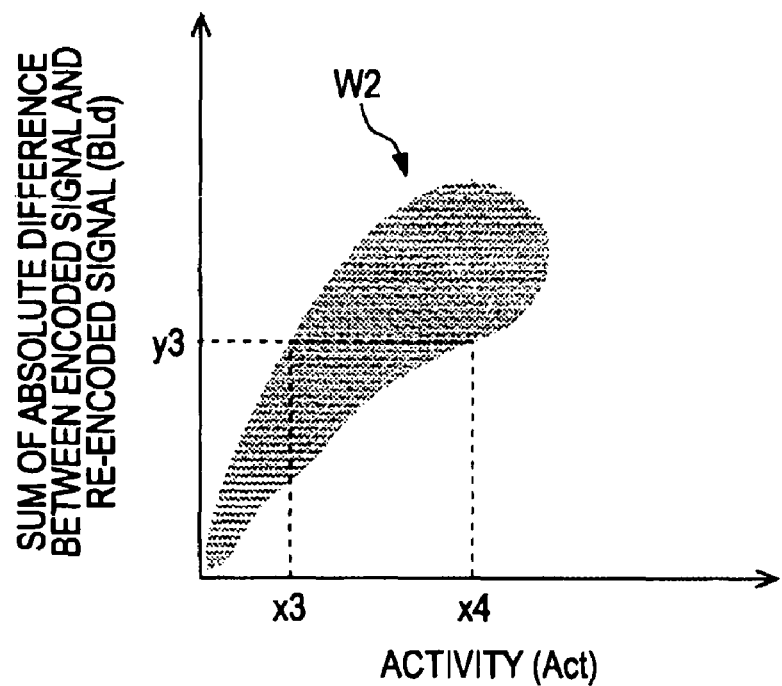
FIG. 8 is a view that illustrates the relationship between the difference between an encoded signal and a re-encoded signal, and an activity of a block.

FIG. 8 is a view that shows the relationship in the same blocks as FIG. 7 between an activity Act of a block and the sum of absolute differences BLd between an encoded signal and a re-encoded signal. In FIG. 8, the abscissa axis represents an activity Act of a block, and the ordinate axis represents a sum of absolute differences BLd between an encoded signal and a re-encoded signal.

FIG. 8 shows a distribution of plotted points as a simplified region W2 on the basis of analyzed data that plot a value of an activity Act of a block and a value of a sum of absolute differences BLd between an encoded signal and a re-encoded signal in regard to all blocks that are shifted in phase from an encoded signal. According to FIG. 8, an upward-sloping proportional relationship is present between an activity Act and a sum of absolute differences BLd between an encoded signal and a re-encoded signal. Thus, it appears that as the activity Act increases, distortion of a phase-shifted and re-encoded signal tends to increase.

In addition, using an activity as an index, it is possible to determine whether it is influenced by a high-frequency component. For example, when the value of the activity is x3 in a case where the value of the sum of absolute differences between an encoded signal and a re-encoded signal is y3, it appears that, because it is not influenced by a high-frequency component in a block when re-encoded, the block is distorted. In addition, when the value of the activity is x4 at the value y3, it appears that, because it is influenced by a high-frequency component in a block when re-encoded, the block is not distorted.

Next, an example in which the region W2 that represents a distribution of the plotted points shown in FIG. 8 is divided on the basis of a value of a sum of absolute differences between an original image and an encoded signal will be described with reference to FIG. 9.

Figure 9:
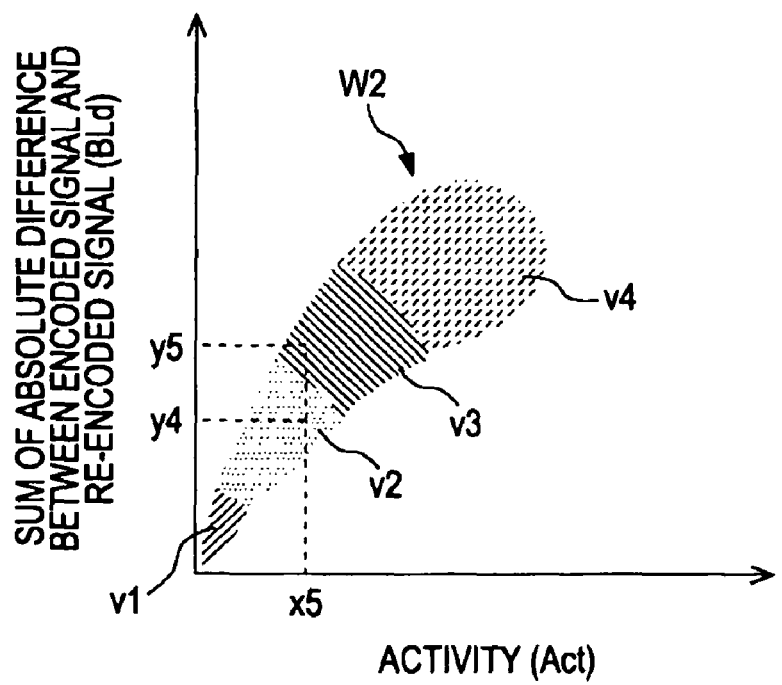
FIG. 9 is a view that illustrates an example in which a region W2 representing a distribution of plotted points shown in FIG. 8 is divided into regions v1 to v4 on the basis of a value of the sum of absolute difference between an original image and an encoded signal.

FIG. 9 is a view that illustrates an example in which the region W2 representing a distribution of plotted points shown in FIG. 8 is divided into regions v1 to v4 on the basis of a value of the sum of absolute differences between an original image and an encoded signal. The region v1 shown in FIG. 9 is a region in which the sum of absolute differences between an original image and an encoded signal is minimal. The region v2 is a region in which the sum of absolute differences between an original image and an encoded signal is the second smallest. The region v3 is a region in which the sum of absolute differences between an original image and an encoded signal is the third smallest. The region v4 is a region in which the sum of absolute differences between an original image and an encoded signal is maximal.

As shown in FIG. 9, it appears that even at the same value of an activity, as distortion of a re-encoded signal increases, distortion from an original image also increases. For example, when the value of the activity is x5, the value y4 representing distortion of a re-encoded signal belongs to the region v2 in which the sum of absolute differences between an original image and an encoded signal is the second smallest. In addition, the value y5 representing distortion of a re-encoded signal belongs to the region v3 in which the sum of absolute differences between an original image and an encoded signal is larger than that of the region v2. Thus, it appears that even at the same value of the activity, as distortion of a re-encoded signal increases, distortion from an original image also increases. Thus, to remove encoding distortion, the amount of distortion of a target block is marked using the activity of the target block and the distortion caused by re-encoding of the target block.

Referring back to FIG. 3, the activity Act of the block BL, calculated by the activity calculation unit 1021, and the difference BLd between the block BL and the block BLE, calculated by the re-encoded difference calculation unit 1023, are output to the class determination unit 1024.

Figure 10:
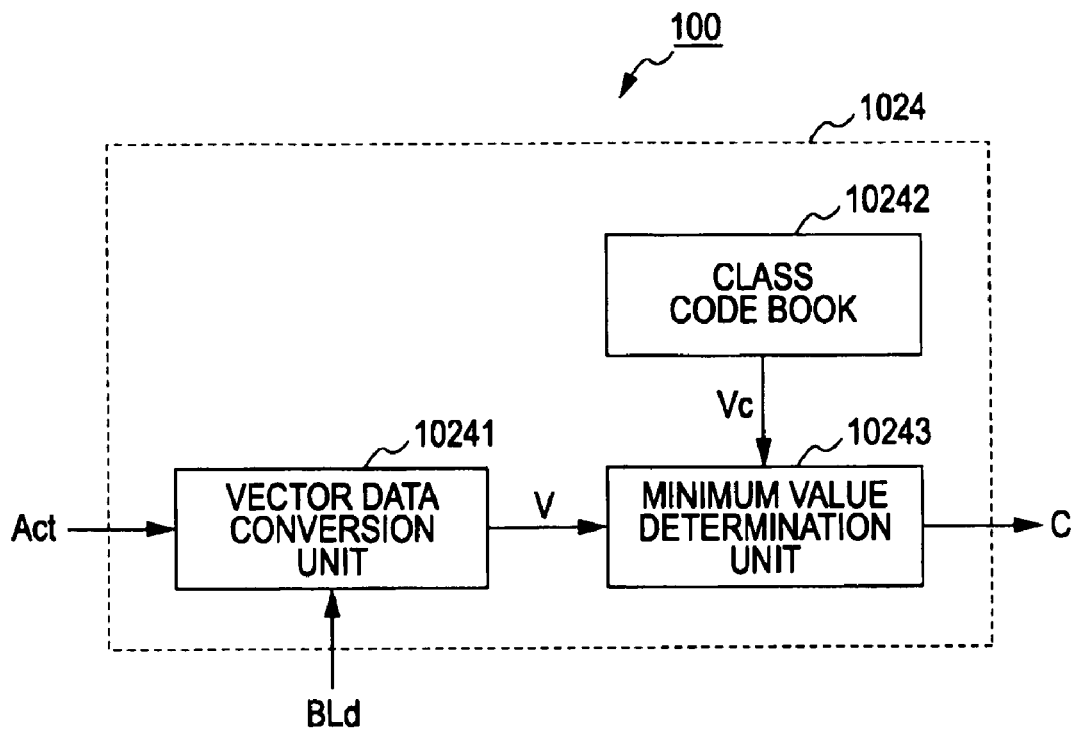
FIG. 10 is a block diagram that shows an example of the configuration of a class determination unit.

Next, an example of the configuration of the class determination unit 1024 will be described. FIG. 10 is a block diagram that shows an example of the configuration of the class determination unit 1024. The class determination unit 1024 shown in FIG. 10 determines a class of each block BL on the basis of a distribution of the difference BLd calculated by the re-encoded difference calculation unit 1023 shown in FIG. 3 and the activity Act calculated by the activity calculation unit 1021. The class determination unit 1024 includes a first vector data conversion unit 10241, a first class code book 10242 and a first minimum value determination unit 10243.

The first vector data conversion unit 10241 inputs an activity Act of the block BL and a difference BLd between the block BL and the block BLE. The vector data conversion unit 10241 combines a plurality of input values as vector data V. Note that in determination made by the first minimum value determination unit 10243, which will be described later, the first vector data conversion unit 10241 normalizes an input value so that the influence of a specific vector is not excessive. A range of a value within which the activity Act of the block BL falls is about ten times a range of a value within which the difference BLd between the block BL and the block BLE falls. Thus, the vector data conversion unit 10241 generates vector data V by the following mathematical expression (4).

[Expression 4]

$$V = (Act/10, BLd) \quad (4)$$

The generated vector data V are output to the minimum value determination unit 10243. The minimum value determination unit 10243 determines vector data Vc, of which a norm with respect to the vector data V generated by the vector data conversion unit 10241 is minimal, from among pieces of vector data Vc stored in the class code book 10242, which is an example of a first class code storage unit. Then, the minimum value determination unit 10243 outputs the number assigned to the vector data Vc as a class C.

The class code book 10242 will be described later; however, the class code book 10242 stores a plurality of pieces of vector data having the same number of dimensions as the vector data V. Elements of the vector data V are defined as the following mathematical expressions (5) and (6). In addition, norms Nc of the vector data V and the pieces of vector data Vc of the class code book 10242 are calculated by the following mathematical expression (7). Then, Vc having the minimum norm Nc is determined.

[Expression 5]

$$V_0 = Act/10 \quad (5)$$

$$V_1 = BLd \quad (6)$$

$$Nc = (V_1 - Vc_0)^2 + (V_1 - Vc_1)^2 \quad (7)$$

Next, the detail of Vc of the class code book 10242 will be described. The pieces of Vc of the class code book 10242 represent arbitrary numbers of vector data that represent a distribution of the activity Act of the entire image and the sum of absolute differences BLd caused by re-encoding.

Figure 11:
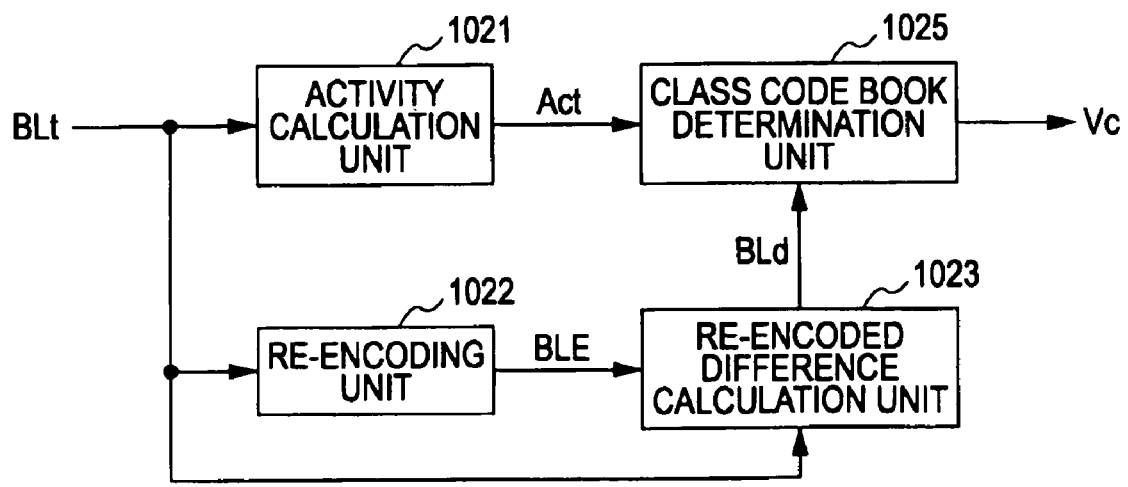
FIG. 11 is a block diagram that shows an example of the configuration at the time of determining Vc of a class code book.

FIG. 11 is a block diagram that shows an example of the configuration at the time of determining Vc of the class code book 10242. Other than the class code book determination unit 1025 shown in FIG. 11, the configuration is the same as that of FIG. 3. Note that an input block signal may be an arbitrary block in an image signal encoded by DCT, so the block is denoted by BLt. As in the case of FIG. 3, the activity Act and the difference BLd caused by re-encoding are calculated for the block BLt, and are output to the class code book determination unit 1025.

Figure 12:
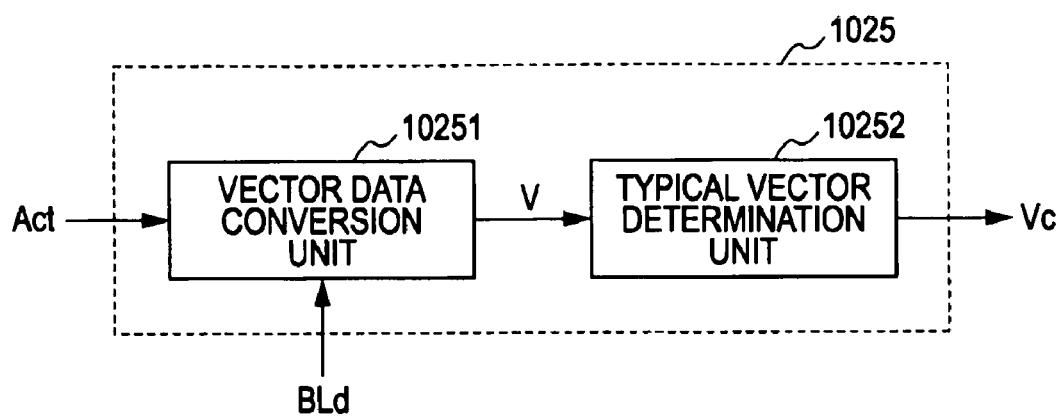
FIG. 12 is a block diagram that shows an example of the configuration of a class code book determination unit.

FIG. 12 is a block diagram that shows an example of the configuration of the class code book determination unit 1025. The class code book determination unit 1025 shown in FIG. 12 includes a vector data conversion unit 10251 and a typical vector determination unit 10252.

In the class code book determination unit 1025, the activity Act and the difference BLd caused by re-encoding are output to the vector data conversion unit 10251. Note that the vector data conversion unit 10251 is similar to the vector data conversion unit 10241 shown in FIG. 10. The vector data V converted by the vector data conversion unit 10251 are output to the typical vector determination unit 10252.

The typical vector determination unit 10252 calculates an arbitrary number of vector data Vc that optimally represent a distribution of all the input vector data V. Calculation of the vector data Vc applies, for example, LBG algorithm to the vector data V to calculate an arbitrary number of vector data Vc. Here, the calculated vector data Vc are held as a class code book, which is used as the class code book 10242 shown in FIG. 10.

With the above described configuration, the degree of degradation of each block BL of an input image signal is handled as a class, so, in a predictive process which will be described later, it is possible to execute the predictive process depending on the degree of degradation.

Referring back to FIG. 1, the coefficient memory 103 is an example of a prediction coefficient generating unit, and generates a prediction coefficient wi corresponding to the class C determined by the classification unit 102A. The prediction coefficient wi is a coefficient that differs depending on a position of a target pixel in a block BL. That is, in a class C, 64 positions are present in a block BL, so 64 coefficients of the class C are present. Thus, if the total number of the classes C is CN, the total number of coefficients is CN×64. Note that a method of generating the prediction coefficient wi will be described later.

Figure 13:
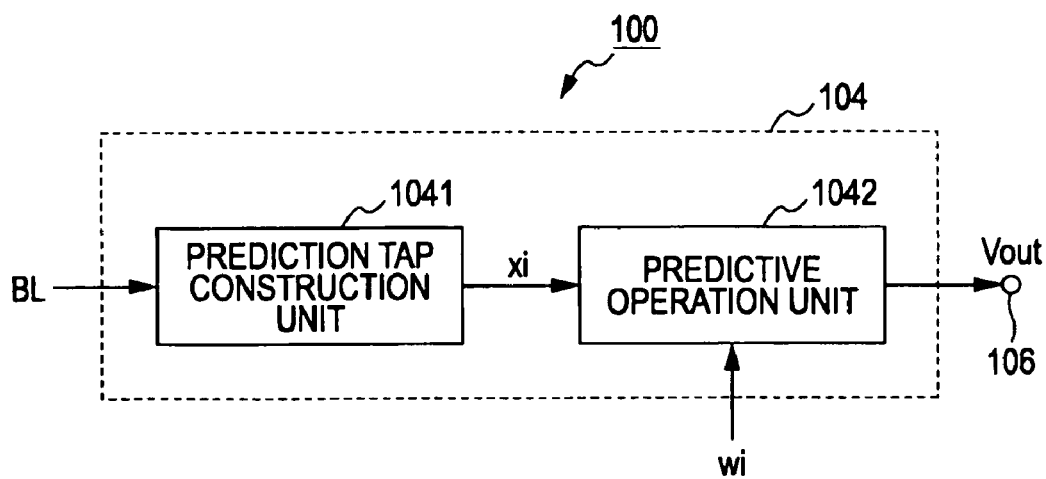
FIG. 13 is a block diagram that shows an example of the configuration of a predictive operation unit.

FIG. 13 is a block diagram that shows an example of the configuration of the predictive operation unit 104. The predictive operation unit 104 shown in FIG. 13 includes a prediction tap construction unit 1041 and a predictive operation unit 1042. The prediction tap construction unit 1041 constructs a prediction tap for calculating a target pixel in a block BL.

Figure 14:
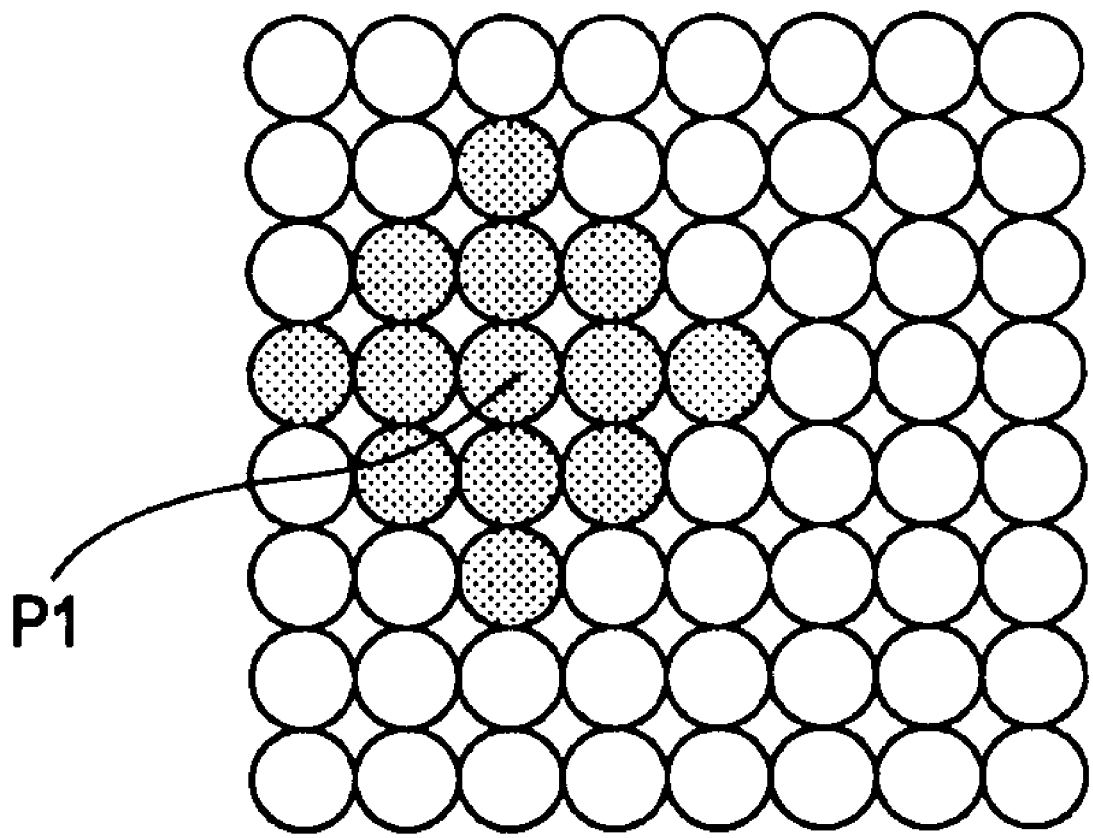
FIG. 14 is a view that illustrates an example of an operation of a prediction tap construction unit.

FIG. 14 shows an example of an operation of the prediction tap construction unit 1041. The prediction tap construction unit 1041 extracts predetermined pixels as a prediction tap for a target pixel position P1. For example, when a rhomboidal prediction tap is used for the target pixel position P1, 13 pixels shown in FIG. 14 are extracted. Here, the extracted pixels are output to the predictive operation unit 1042 shown in FIG. 13 as xi.

The predictive operation unit 1042 performs predictive operation using the following mathematical expression (8) on the basis of the prediction tap pixels xi from the prediction tap construction unit 1041 and the prediction coefficient wi input from the coefficient memory 103 to calculate an output pixel value at the target pixel position. Here, m is the number of prediction taps.

[Expression 6]

$$\sum_{i=1}^{m} w_i \cdot x_i \quad (8)$$

The above process is carried out on all the pixels in the block BL and is similarly carried out on each of the blocks BL to obtain an output image Vout, from which distortion is removed, from an output terminal 106.

In this way, the image processing apparatus 100 and the image signal processing method according to the embodiment of the invention mark the degree of degradation of a block on the basis of a difference when re-encoded and an activity of the block.

Thus, it is possible to appropriately remove distortion in accordance with the degree of degradation of a block. For example, it is possible to separate portions, at which mosquito noise occurs, from detail portions. Thus, it is possible to remove distortion by removing mosquito noise but not removing a detail.

Figure 15:
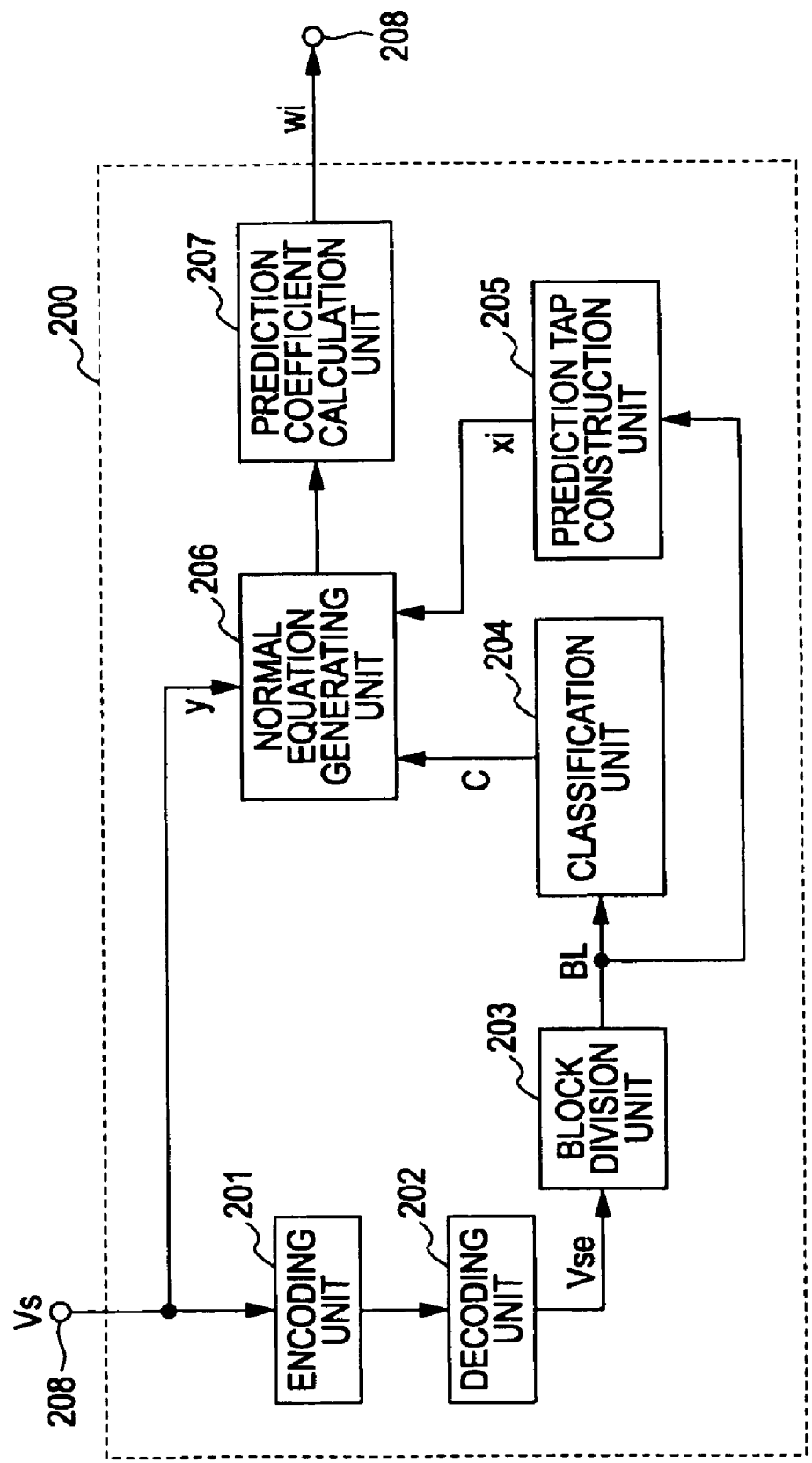
FIG. 15 is a block diagram that shows an example of the configuration of a prediction coefficient generating apparatus.

Next, a method of generating the prediction coefficient wi will be described. FIG. 15 is a block diagram that shows an example of the configuration of a prediction coefficient generating apparatus 200. The prediction coefficient generating apparatus 200 shown in FIG. 15 includes an encoding unit 201, a decoding unit 202, a block division unit 203, a classification unit 204, a prediction tap construction unit 205, a normal equation generating unit 206 and a prediction coefficient calculation unit 207. Note that the normal equation generating unit 206 and the prediction coefficient calculation unit 207 are an example of a prediction coefficient operation unit.

An image signal Vs, which is not encoded, is input from the input terminal 208. Next, the encoding unit 201 encodes the image signal Vs by DCT. Then, the decoding unit 202 decodes the encoded signal to generate an encoded image signal Vse. Note that quantization of DCT in the encoding unit 201 may be selected and may be changed in accordance with a block.

The block division unit 203 divides the encoded image signal Vse into blocks. Note that the block division unit 203 is similar to the block division unit 101 shown in FIG. 1. The classification unit 204 determines a class C of each of the blocks BL divided by the block division unit 203 and transfers the determined classes C to the normal equation generating unit 206. Note that the classification unit 204 is similar to the classification unit 102A shown in FIG. 1.

Moreover, the prediction tap construction unit 205 constructs a prediction tap xi for a target pixel position for each block BL, and outputs the prediction tap xi to the normal equation generating unit 206. Note that the prediction tap construction unit 205 is similar to the prediction tap construction unit 1041 shown in FIG. 13. Furthermore, a pixel value y of the image signal Vs corresponding to the target pixel position is also output to the normal equation generating unit 206.

The normal equation generating unit 206 generates the following prediction equation (9) for each class C output from the classification unit 204 and each target pixel in a block BL on the basis of the pixel value y of the image signal Vs and the prediction tap xi extracted by the prediction tap construction unit 205.

[Expression 7]

$$y_k = \sum_{i=1}^{m} w_i \cdot x_{ki} \qquad (9)$$

Here, $y_k$ denotes the pixel value of the image signal Vs and denotes the k-th pixel value among the pixels having the same prediction equation, $x_{ki}$ denotes the pixel value of the k-th prediction tap i among the pixels having the same prediction equation, m denotes the number of prediction taps, and wi denotes the prediction coefficient. Thus, if the number of pixels used for generation of prediction equation is N, wi in the following mathematical expression (10) may be calculated as a prediction coefficient.

[Expression 8]

$$E = \sum_{k=1}^{N} \left( y_k - \sum_{i=1}^{m} w_i x_{ki} \right)^2 \qquad (10)$$

Thus, the following mathematical expression (11) is obtained from the mathematical expression (10) to make it possible to calculate a prediction coefficient.

[Expression 9]

$$\frac{dE}{dw_i} = 0 \qquad (11)$$

When the mathematical expression (11) is expanded, the following mathematical expression (14) is derived from the following mathematical expressions (12) and (13).

[Expression 10]

$$X_{ij} = \sum_{k=1}^{N} x_{ki} x_{kj} \qquad (12)$$

$$Y_i = \sum_{k=1}^{N} x_{ki} y_i \qquad (13)$$

$$\begin{pmatrix} x_{11} & x_{12} & \cdots & x_{1m} \\ x_{21} & x_{22} & \cdots & x_{2m} \\ \cdots & \cdots & \ddots & \cdots \\ x_{m1} & x_{m2} & \cdots & x_{mm} \end{pmatrix} \begin{pmatrix} w_1 \\ w_2 \\ \cdots \\ w_m \end{pmatrix} = \begin{pmatrix} Y_1 \\ Y_2 \\ \cdots \\ Y_m \end{pmatrix} \qquad (14)$$

The mathematical expression (14) is generally called normal equation. As described above, the normal equation generating unit 206 generates the normal equation of the mathematical expression (14) for each class C and each position of a target pixel in each block BL, and outputs the normal equations to the coefficient calculation unit 207.

The coefficient calculation unit 207 solves the normal equations of the mathematical expression (14) generated by the normal equation generating unit 206 for wi using a sweep out method (Gauss-Jordan elimination), or the like, and outputs wi as prediction coefficients. The output prediction coefficients wi are held by the coefficient memory 103 shown in FIG. 1.

In this way, the prediction coefficient generating apparatus 200 and the prediction coefficient generating method mark the degree of degradation of a block on the basis of a difference when re-encoded. In addition, the activity of the block is also used as a characteristic amount at the same time, and then the block is classified on the basis of the difference and the activity to make it possible to appropriately remove distortion in accordance with the degree of degradation of the block. Thus, for example, it is possible to separate portions, at which mosquito noise occurs, from detail portions. Thus, it is possible to remove distortion by removing mosquito noise but not removing a detail.

Figure 16:
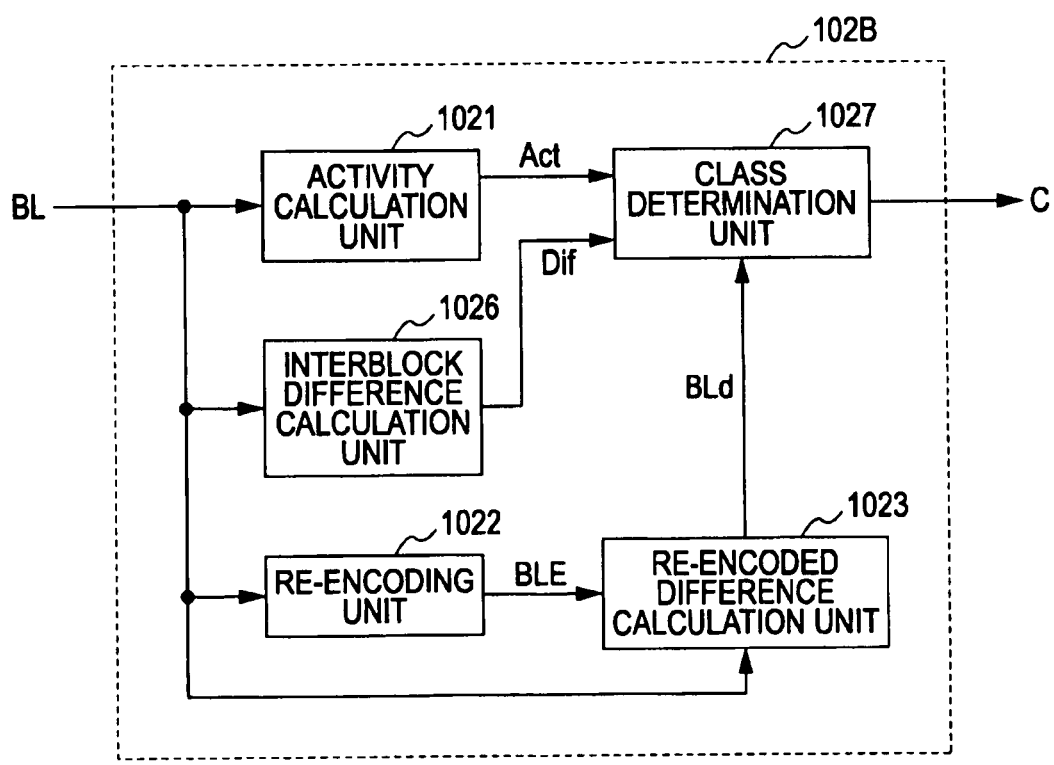
FIG. 16 is a block diagram that shows an example of the configuration of a classification unit according to a second embodiment of the invention.

In addition, a plurality of classification methods according to the embodiment of the invention are present other than the classification unit 102A shown in FIG. 3, so, hereinafter, the detail thereof will be described. FIG. 16 is a block diagram that shows an example of the configuration of a classification unit 102B according to a second embodiment of the invention. The classification unit 102B shown in FIG. 16 additionally includes an interblock difference calculation unit 1026 in comparison with the classification unit 102A shown in FIG. 3. In accordance with the addition of the interblock difference calculation unit 1026, the number of dimensions of a vector handled in the class determination unit 1027 is increased. Other than that, the configuration is similar to that of FIG. 3.

Figure 17:
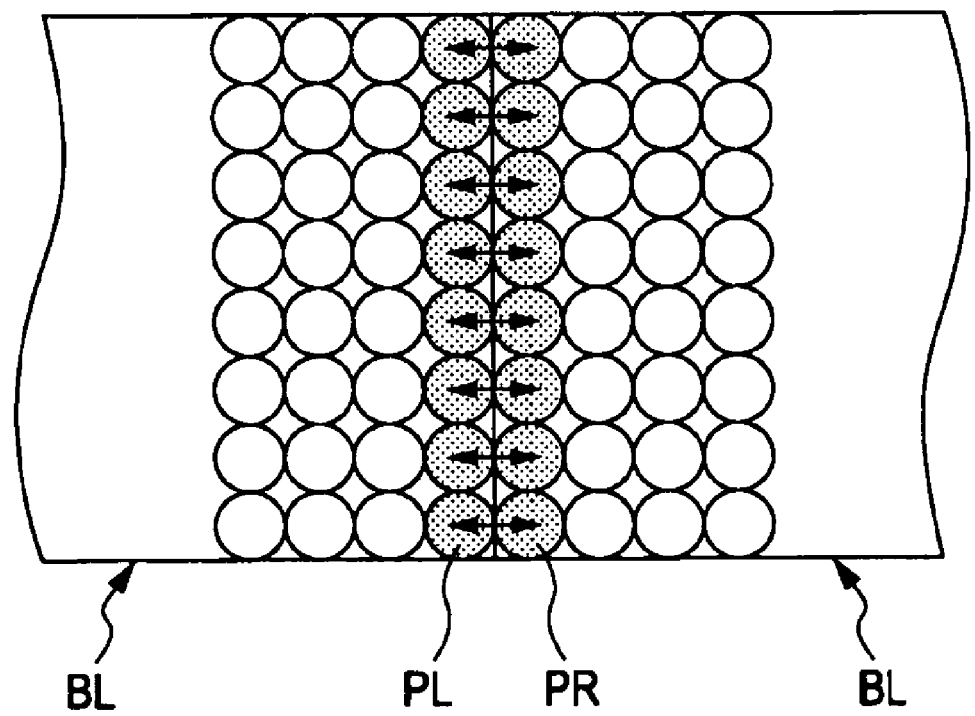
FIG. 17 is a view that illustrates an example of an operation of an interblock difference calculation unit.

FIG. 17 is a view that illustrates an example of an operation of the interblock difference calculation unit 1026. When the divided blocks BL are arranged as shown in FIG. 2, the interblock difference calculation unit 1026 calculates an interblock difference Dif between boundary pixels at the horizontal boundary of the adjacent blocks BL in regard to a plurality of blocks BL as shown in FIG. 17. When the left pixel and the right pixel at the horizontal boundary are denoted by PL and PR, respectively, the interblock difference calculation unit 1026 calculates the interblock difference Dif using the following mathematical expression (15).

[Expression 11]

$$Dif = \sum_{i=1}^{8} |PL_i - PR_i| \tag{15}$$

As a reason for using the above configured process, in the second embodiment according to the invention, an interblock difference is additionally used as a characteristic amount in addition to the configuration of FIG. 3. Thus, distortion removal is performed on the input image signal additionally using the degree of degradation at the horizontal boundary of the blocks processed by DCT.

Figure 18A:
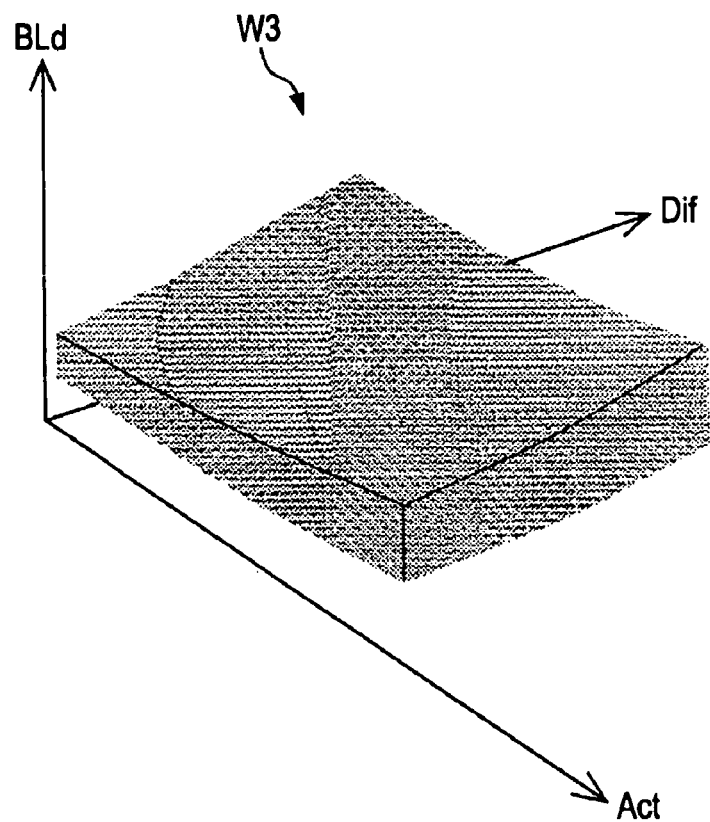
FIG. 18A and FIG. 18B are views that illustrate the relationship among a difference between an encoded signal and a re-encoded signal, an activity of a block, and an interblock difference.

FIG. 18A adds an interblock difference Dif to FIG. 8 and shows a distribution of plotted points as a simplified region W3 on the basis of analyzed data that plot an activity Act of a block, an interblock difference Dif, and a value of a sum of absolute differences BLd between an encoded signal and a re-encoded signal. In FIG. 18A, the abscissa axis represents an interblock difference Dif, the ordinate axis represents an activity Act of a block and the vertical axis represents a sum of absolute differences BLd between an encoded signal and a re-encoded signal.

According to FIG. 18A, it appears that, as the values of the interblock difference Dif and activity Act increase, the difference BLd caused by re-encoding also increases.

Next, an example in which the region W3 that represents a distribution of the plotted points shown in FIG. 18A is divided on the basis of a value of a sum of absolute differences between an original image and an encoded signal will be described with reference to FIG. 18B.

Figure 18B:
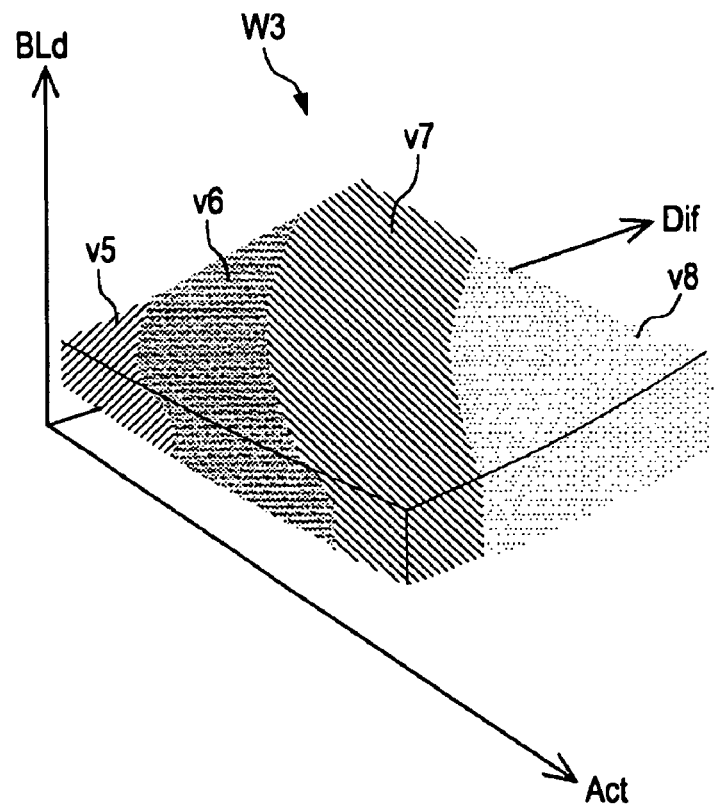

FIG. 18B is a view that illustrates an example in which the region W3 representing a distribution of plotted points shown in FIG. 18A is divided into regions v5 to v8 on the basis of a value of the sum of absolute differences between an original image and an encoded signal. The region v5 shown in FIG. 18B is a region in which the sum of absolute differences between an original image and an encoded signal is minimal. The region v6 is a region in which the sum of absolute differences between an original image and an encoded signal is the second smallest. The region v7 is a region in which the sum of absolute differences between an original image and an encoded signal is the third smallest. The region v8 is a region in which the sum of absolute differences between an original image and an encoded signal is maximal.

According to FIG. 18B, it appears that, even at the same value of the interblock difference Dif, a difference between an original image and an encoded signal varies depending on the activity Act of the block and/or the difference BLd caused by re-encoding. Thus, it appears that, by using these three characteristic amounts, it is possible to remove distortion in accordance with the degree of degradation at a block boundary.

Figure 19:
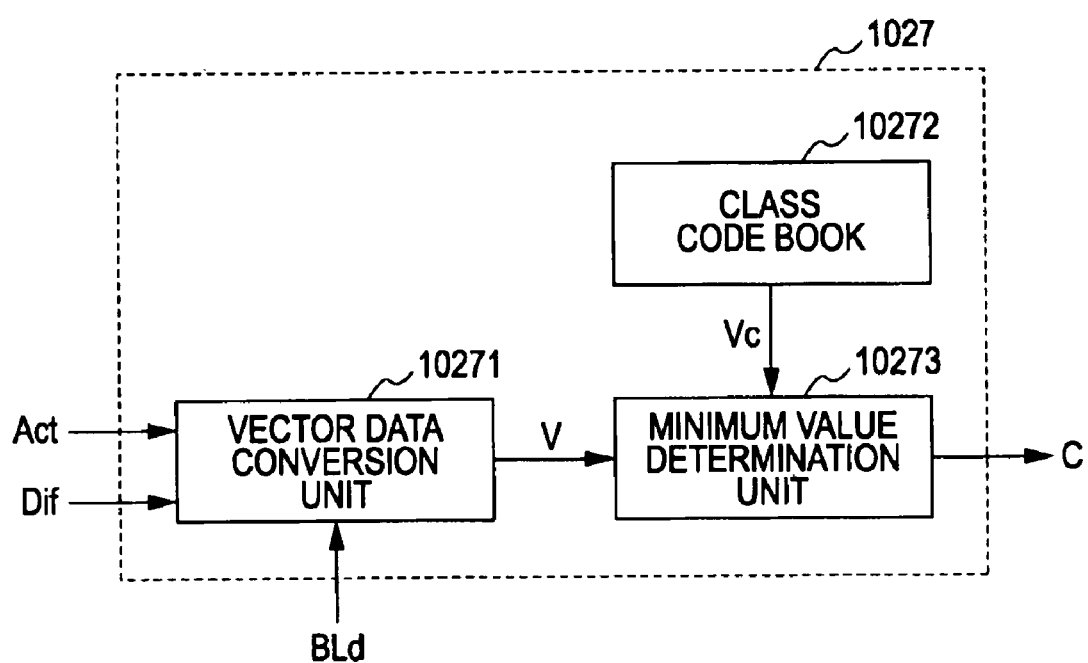
FIG. 19 is a block diagram that shows an example of the configuration of a class determination unit.

FIG. 19 is a block diagram that shows an example of the configuration of the class determination unit 1027. The configuration of the class determination unit 1027 shown in FIG. 19 is similar to the class determination unit 1024 shown in FIG. 10; however, in the classification unit 102B, the number of dimensions handled in vector data increases by one, that is, the interblock difference Dif is additionally handled.

The second vector data conversion unit 10271 combines a plurality of input values as vector data V. Note that in determination made by the second minimum value determination unit 10273, which will be described later, the second vector data conversion unit 10271 normalizes an input value so that the influence of a specific vector is not excessive. A range of a value within which the activity Act of the block BL falls is about ten times a range of a value within which the difference BLd between the block BL and the block BLE falls, and also ten times an interblock difference Dif at a horizontal boundary between the adjacent blocks processed on the input image signal by DCT. Thus, the second vector data conversion unit 10271 generates vector data V by the following mathematical expression (16).

[Expression 12]

$$V=(Act/10, BLd, Dif) \tag{16}$$

The generated vector data V are output to the second minimum value determination unit 10273. The minimum value determination unit 10273 determines Vc having a minimum norm with respect to the vector data V from the vector data conversion unit 10271 from among pieces of Vc output from the second class code book 10272, and outputs the number C assigned to Vc as a class.

The class code book 10272, which is an example of a second class code storage unit and will be described later, stores a plurality of pieces of vector data having the same number of dimensions as the vector data V. Elements of the vector data V are defined like the above described mathematical expressions (5) and (6) and the following mathematical expression (17), and norms Nc of the vector data V and the pieces of Vc of the class code book 10272 are calculated by the following mathematical expression (18). Then, Vc having the minimum norm Nc is determined.

[Expression 13]

$$V_2 = Dif \tag{17}$$

$$Nc = (V_0 - Vc_0)^2 + (V_1 - Vc_1)^2 + (V_2 - Vc_2)^2 \tag{18}$$

Next, the detail of Vc of the class code book 10272 will be described. The pieces of Vc of the class code book 10242 represent arbitrary numbers of vector data that represent a distribution of the activity Act of the entire image, the interblock difference Dif, and the sum of absolute differences BLd caused by re-encoding.

Figure 20:
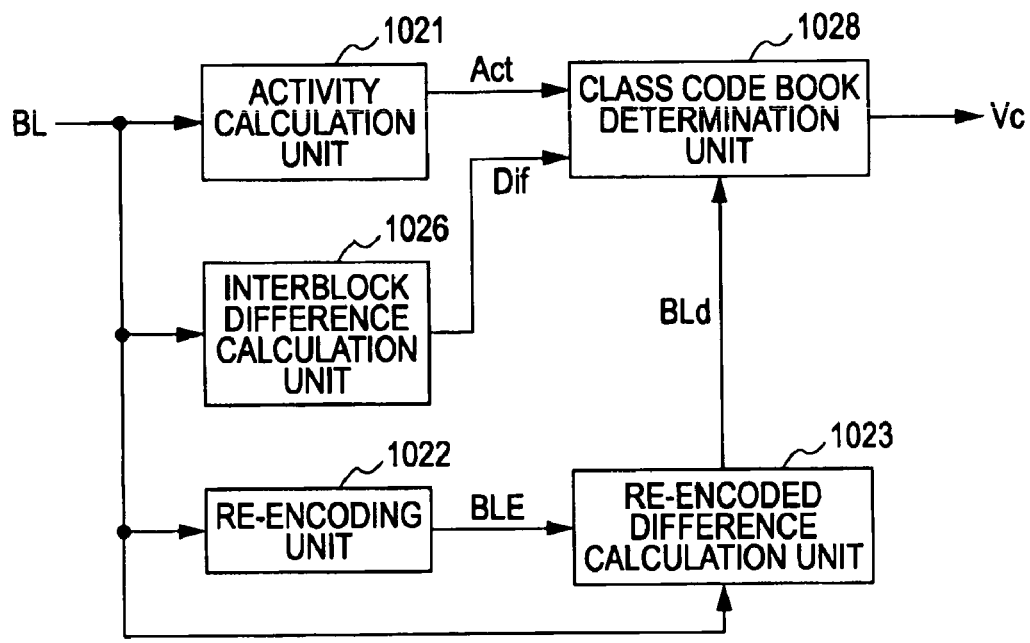
FIG. 20 is a block diagram that shows an example of the configuration at the time of determining Vc of a class code book.

FIG. 20 is a block diagram that shows an example of the configuration at the time of determining Vc of the class code book 10272. Other than the class code book determination unit 1028 shown in FIG. 20, the configuration is the same as that of FIG. 16. Note that an input block signal may be an arbitrary block in an image signal encoded by DCT, so the block is denoted by BLt. As in the case of FIG. 16, the activity Act, the interblock difference Dif, and the difference BLd caused by re-encoding are calculated for the block BLt, and are output to the class code book determination unit 1028.

Figure 21:
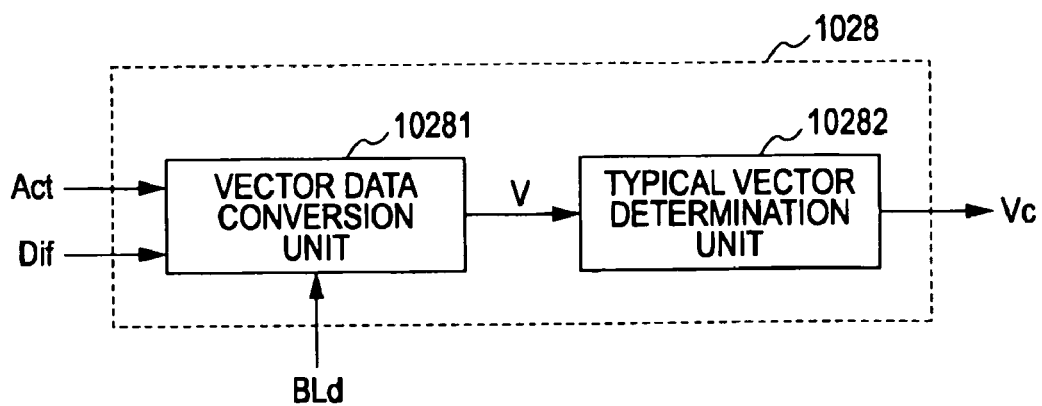
FIG. 21 is a block diagram that shows an example of the configuration of a class code book determination unit.

FIG. 21 is a block diagram that shows an example of the configuration of the class code book determination unit 1028. The class code book determination unit 1028 shown in FIG. 21 includes a vector data conversion unit 10281 and a typical vector determination unit 10282.

In the class code book determination unit 1028, the activity Act, the interblock difference Dif, and the difference BLd caused by re-encoding are output to the vector data conversion unit 10281. Note that the vector data conversion unit 10281 is similar to the vector data conversion unit 10271 shown in FIG. 19. The vector data V converted by the vector data conversion unit 10281 are output to the typical vector determination unit 10282.

The typical vector determination unit 10282 calculates an arbitrary number of vector data Vc that optimally represent a distribution of all the input vector data V. Calculation of the vector data Vc applies, for example, LBG algorithm to the vector data V to calculate an arbitrary number of vector data Vc. Here, the calculated pieces of vector data Vc are held as a class code book, which is used as the class code book 10272 shown in FIG. 19.

In addition, in accordance with the configuration of the classification unit 102B, generation of prediction coefficients wi held by the coefficient memory 103 differs from that of FIG. 15 in that the configuration of the classification unit 204 shown in FIG. 15 is replaced with the configuration of the classification unit 102B, and other operations are the same.

In this way, the classification unit 102B according to the second embodiment of the invention marks the degree of degradation of a block on the basis of a difference when re-encoded. In addition, the activity of the block and the interblock difference are also used as characteristic amounts at the same time, and then the block is classified on the basis of the difference, the interblock difference, and the activity to make it possible to appropriately remove distortion in accordance with the degree of degradation of the block. For example, it is possible to separate portions, at which mosquito noise occurs, from detail portions. Thus, it is possible to remove distortion by removing mosquito noise but not removing a detail. Furthermore, it is also possible to separate portions at which block distortion occurs at a block boundary and portions at which a block boundary is an edge. Then, it is possible to perform distortion removal in which block distortion is removed but no edge is removed.

As is apparent from a difference in configuration between the classification unit 102A shown in FIG. 13 and the classification unit 102B shown in FIG. 16, the number of dimensions of a vector used in the class determination unit 1024 or the class determination unit 1027 is determined on the basis of the number of characteristic amounts of a block BL. Thus, when the number of characteristic amounts of a block BL is further increased, the number of dimensions of a vector increases depending on the number of the characteristic amount increased. For example, when a difference at a vertical block boundary is further added as a characteristic amount in addition to the configuration of the classification unit 102B, it is only necessary that the block division unit 101 shown in FIG. 1 sets blocks BL at positions shifted horizontally by four pixels and vertically by four pixels, and, as in the case of FIG. 17, a difference at a vertical block boundary is additionally added.

Figure 22:
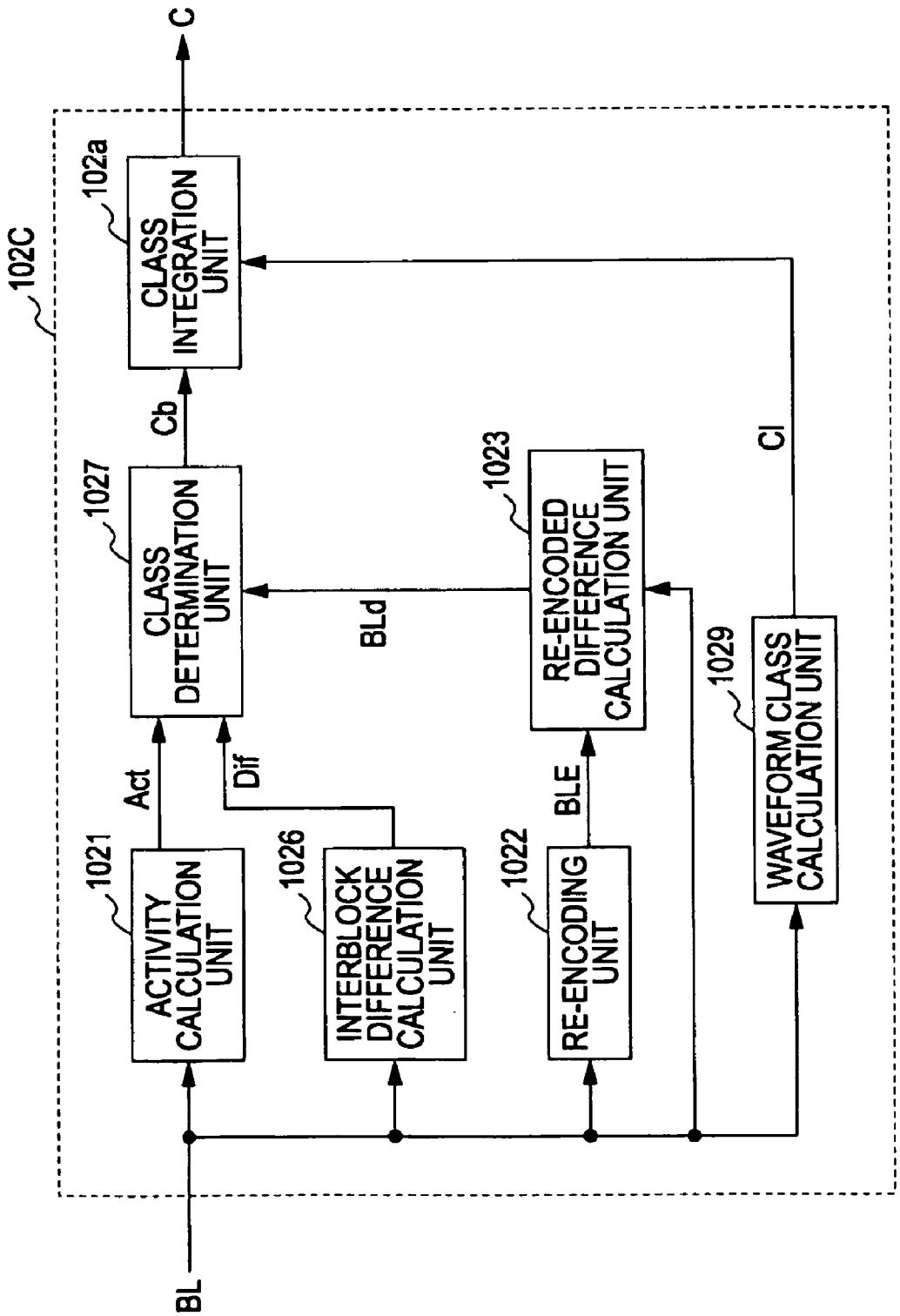
FIG. 22 is a block diagram that shows an example of the configuration of a classification unit according to a third embodiment of the invention.

FIG. 22 is a block diagram that shows an example of the configuration of a classification unit 102C according to a third embodiment of the invention. The configuration of the classification unit 102C is similar to the configuration of the classification unit 102B shown in FIG. 16 except that a waveform class calculation unit 1029 and a class integration unit 102a are added. In addition, to distinguish a class determined by the class determination unit 1027 from a class calculated by the waveform class calculation unit 1029, the class determined by the class determination unit 1027 is denoted by Cb.

Figure 23:
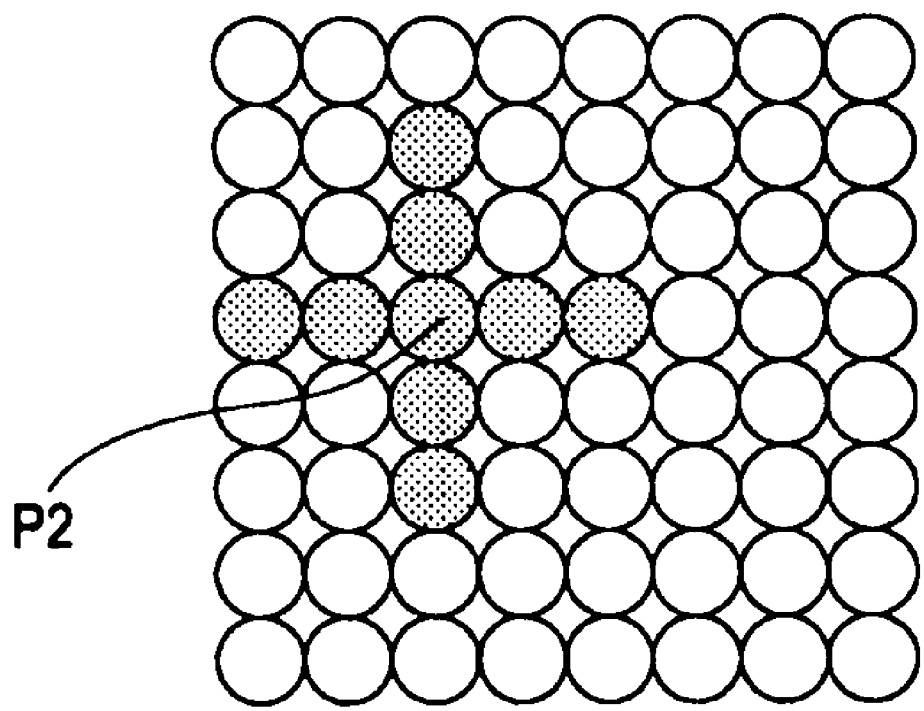
FIG. 23 is a view that illustrates an example of an operation of a waveform class calculation unit.

FIG. 23 is a view that illustrates an example of an operation of the waveform class calculation unit 1029. The waveform class calculation unit 1029 extracts, for example, pixels shown in FIG. 23 in order to calculate a class on the basis of a characteristic amount of a waveform in a target pixel and pixels around the target pixel. For example, ADRC (Adaptive Dynamic Range Coding) is used as the characteristic amount of a waveform. In ADRC, where the maximum value of pixel data is max, the minimum value is min, the dynamic range is DR (max−min+1), and the requantization bit count is P, a requantization code Qi may be obtained through the following mathematical expression (19) for prediction tap pixels xi. Here, in the mathematical expression (19), "[ ]" means rounddown.

[Expression 14]

$$Q_i = [(x_1 - \min + 0.5) \times 2^P \div DR] \quad (19)$$

Then, a class Cl may be obtained from the requantization codes Qi obtained from the respective pieces of pixel data by the following mathematical expression (20). Here, the number of pieces of pixel data is Na.

[Expression 15]

$$Cl = \sum_{i=1}^{Na} Q_i \cdot (2^P)^i \quad (20)$$

The class integration unit 102a determines a class by integrating a class Cb determined by the class determination unit 1027 with a class determined by the waveform class calculation unit 1029. When the number of the classes Cl is Ncl, the class integration unit 102a uses the following mathematical expression (21) to determine an ultimate class C.

[Expression 16]

$$C = Cb \times N_{cl} + Cl \quad (21)$$

That is, in contrast with the above classification unit 102A and the classification unit 102B, the classification unit 102C uses the waveform characteristic amount at a target pixel for a class.

In addition, in accordance with the classification unit 102C, generation of prediction coefficients wi held by the coefficient memory 103 differs from that of FIG. 15 in that the configuration of the classification unit 204 shown in FIG. 15 is replaced with the configuration of the classification unit 102C, and other operations are the same.

As described above, the classification unit 102C, in contrast with the classification unit 102B, also uses the waveform characteristic amount of a target pixel for a class to make it possible to utilize waveform information around the target pixel. Thus, in comparison with the classification unit 102B, it is possible to perform distortion removal with further high performance.

In this way, the classification unit 102C according to the third embodiment of the invention marks the degree of degradation of a block on the basis of a difference when re-encoded. In addition, the activity of the block, the interblock difference and, furthermore, the waveform characteristic amount of a target pixel are also used as characteristic amounts at the same time to make it possible to appropriately remove distortion in accordance with the degree of degradation of the block. In addition, according to the embodiment of the invention, DCT is described as an example for encoding using orthogonal transformation. Instead, when encoding using another orthogonal transformation, such as DST or slant transform, is employed as well, it is possible to perform distortion removal using similar characteristics.

Figure 24:
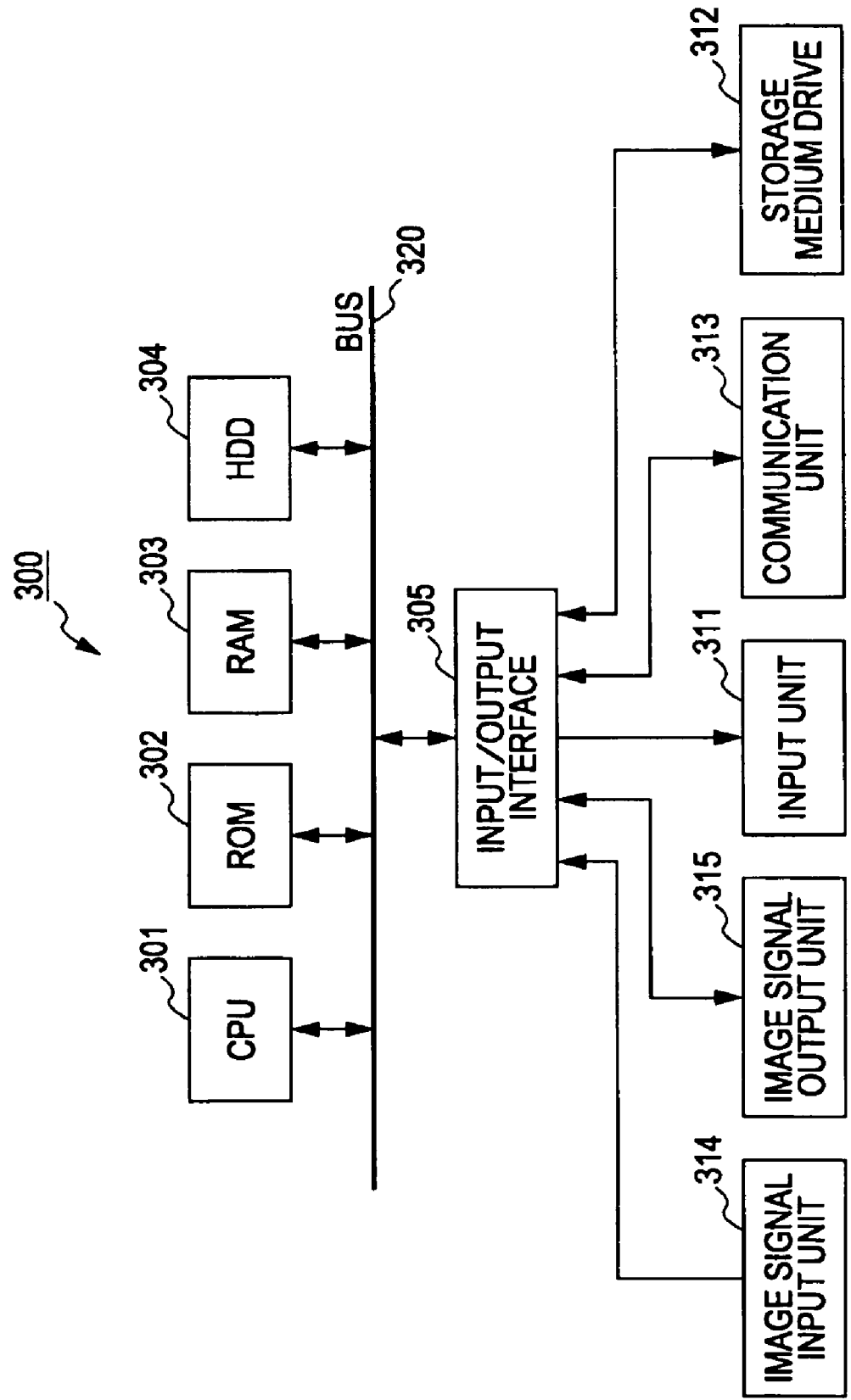
FIG. 24 is a block diagram that shows an example of the configuration of an image processing apparatus implemented by software according to an embodiment of the invention.

Furthermore, the above described processes may be not only implemented by hardware but also implemented by software. The configuration in this case is shown in FIG. 24. FIG. 24 is a block diagram that shows an example of the configuration of an image processing apparatus 300, which is an example of a computer that executes a program according to en embodiment of the invention. As shown in FIG. 24, the image processing apparatus 300 incorporates a CPU (Central Processing Unit) 301 that is connected to a ROM 302, a RAM 303, a HDD 304 and an input/output interface 305 via a bus 320. Furthermore, an input unit 311, a recording medium drive 312, a communication unit 313, an image signal input unit 314 and an image signal output unit 315 are connected to the input/output interface 305.

When a command is input from an external device or when a command is input from the input unit 311 that is formed of operating means, such as a keyboard or a mouse, or an audio input means, such as a microphone, the command is supplied through the input/output interface 305 to the CPU 301.

The CPU 301 executes a program stored in the ROM 302, the RAM 303 or the HDD 304 to carry out process in accordance with the supplied command. Furthermore, an image processing program for causing the image processing apparatus 300 to execute a process similar to that executed by the image processing apparatus 100 is stored in the ROM 302, the RAM 303 or the HDD 304 in advance, and an output image is generated on the basis of an input image signal input to the image signal input unit 314 and is output from the image signal output unit 315.

In addition, it is also applicable that the image processing program is recorded in a recording medium and then the image processing program recorded in the recording medium or the image processing program recorded in the recording medium is read by the recording medium drive 312 to cause the image processing apparatus 300 to execute the image processing program. Furthermore, the image processing program may be transmitted or received by the communication unit 313 via a transmission line, and the received image processing program may be executed on the image processing apparatus 300.

Figure 25:
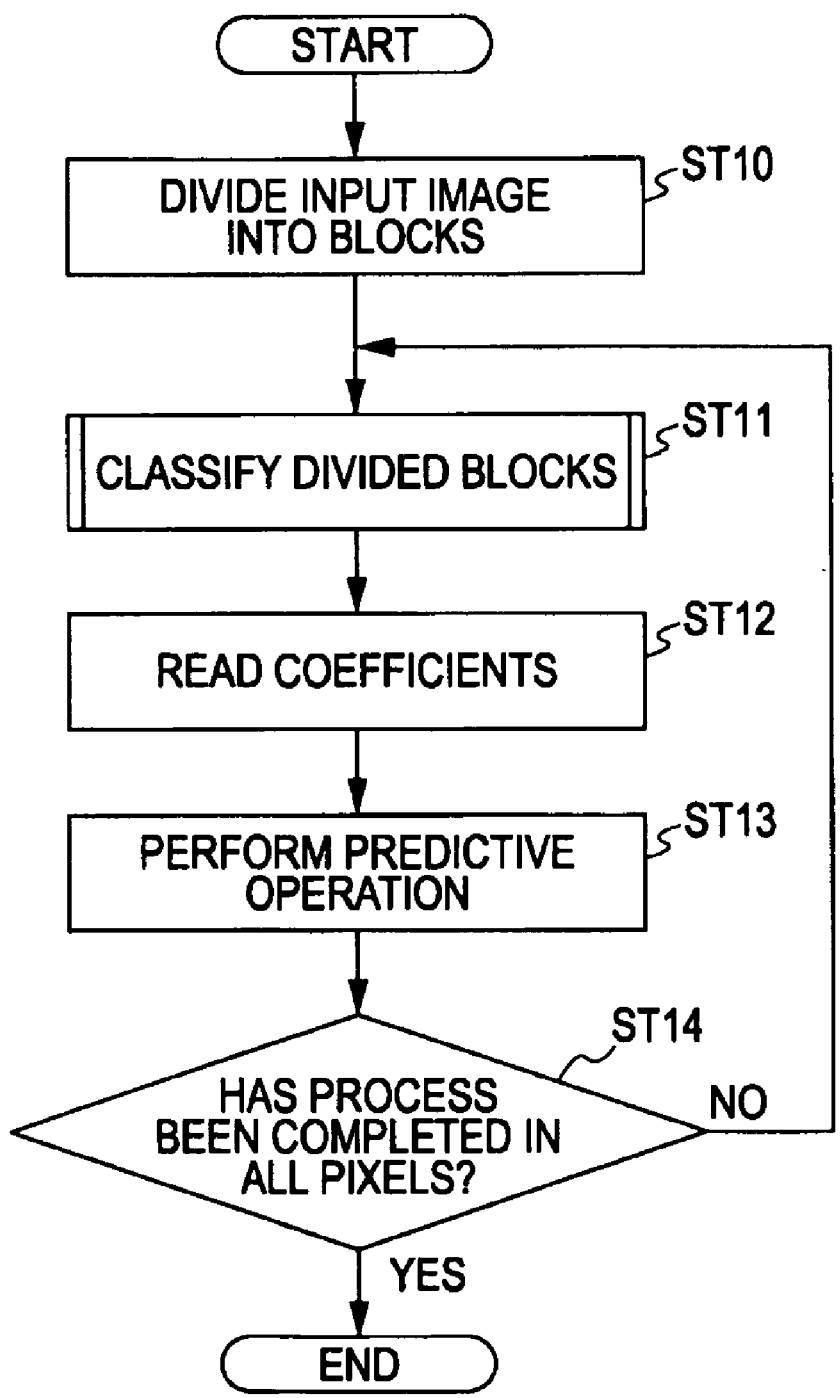
FIG. 25 is a flowchart that shows an example of an operation of the image processing apparatus.

FIG. 25 is a flowchart that shows an example of an operation of the image processing apparatus 300 implemented by software according to an embodiment of the invention. In step ST10, an input image is divided into blocks. Next, in step ST11, the divided blocks are classified. Then, in step ST12, prediction coefficients corresponding to classes are read. After that, in step ST13, predictive operation is performed. Subsequently, in step ST14, it is determined whether the process has been completed in all the pixels. If the process has not been completed in all the pixels, the process returns to step ST11 to continue the process. If the process has been completed, the image is output to end the process.

Figure 26:
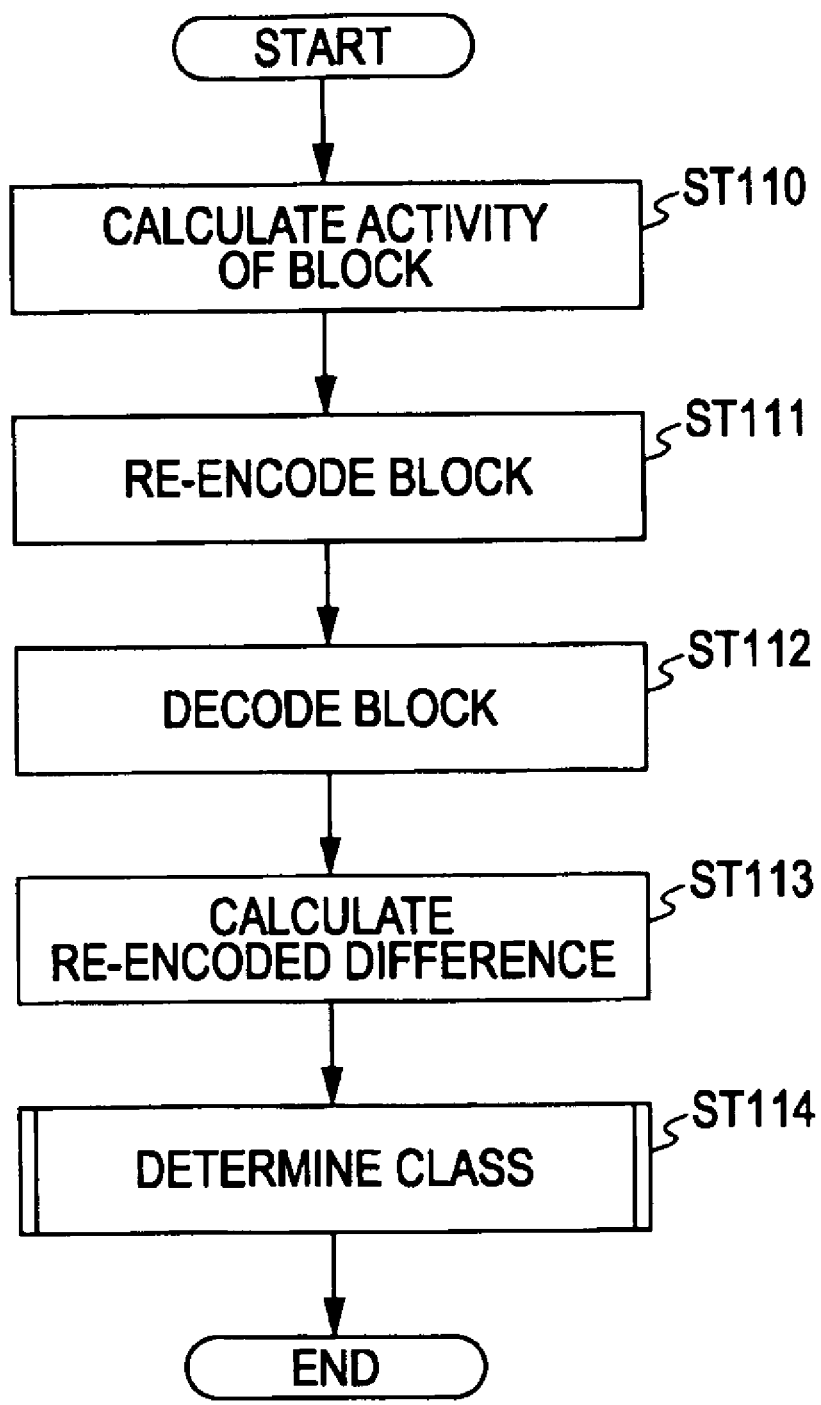
FIG. 26 is a flowchart that shows an example of an operation in a first configuration of classification in step ST11 in FIG. 25.

FIG. 26 is a flowchart in a first configuration of classification in step ST11 in FIG. 25. In step ST110, an activity of a block is calculated. Then, in step ST111, the block is re-encoded. After that, in step ST112, the re-encoded data are decoded. Subsequently, in step ST113, a difference between before and after re-encoding is calculated. Then, in step ST114, a class is determined on the basis of the results of step ST110 and step ST113.

Figure 27:
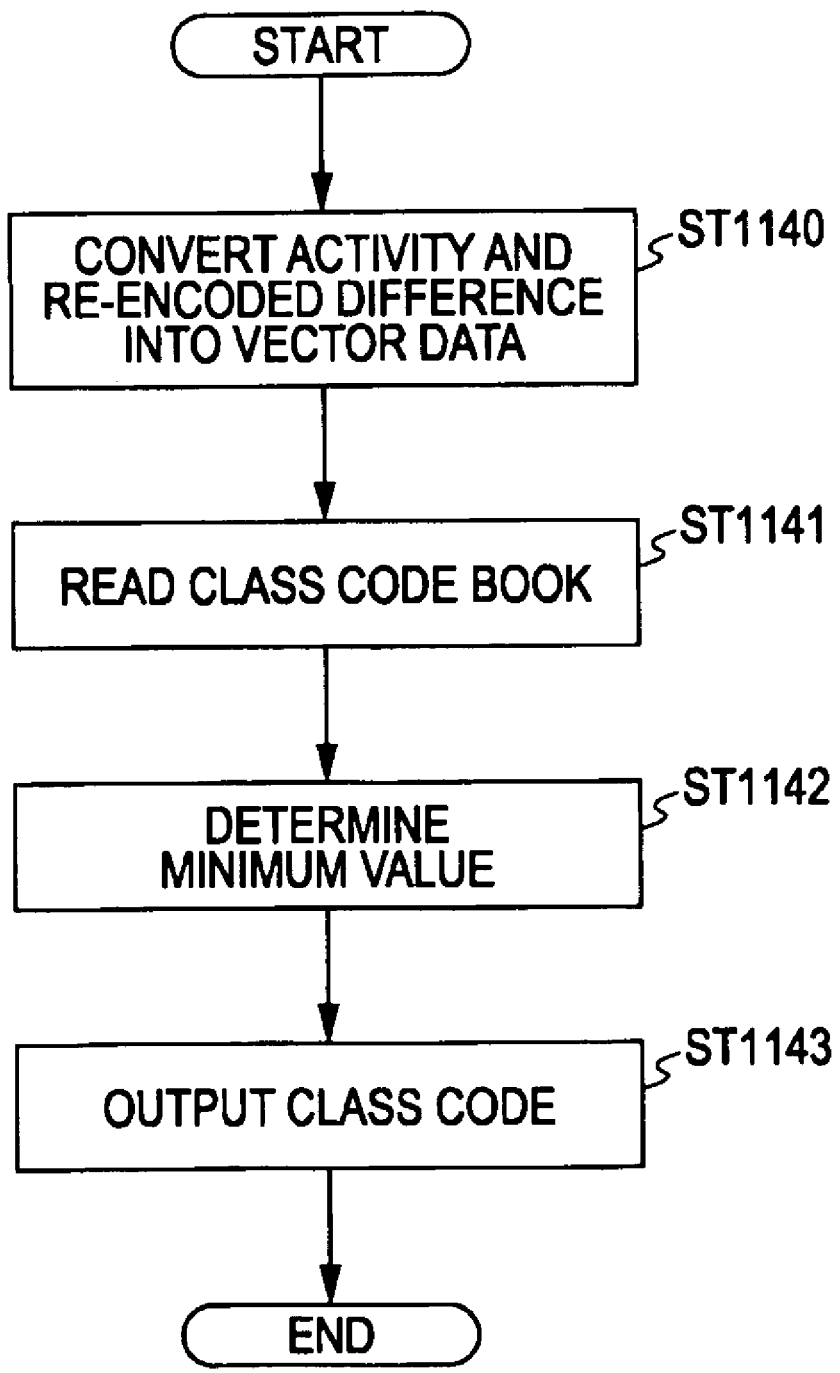
FIG. 27 is a flowchart that shows an example of an operation of class determination in step ST114 in FIG. 26.

FIG. 27 is a flowchart of class determination in step ST114 in FIG. 26. In step ST1140, the results of step ST110 and step ST113 in FIG. 26 are converted into vector data. Then, in step ST1141, the class code book is read. After that, in step ST1142, a piece of vector data having a minimum norm to the vector data converted in step ST1140 is determined from the class code book read in step ST1141. Subsequently, in step ST1143, the number assigned to the vector data in the class code book, determined in step ST1142, is output as a class.

Figure 28:
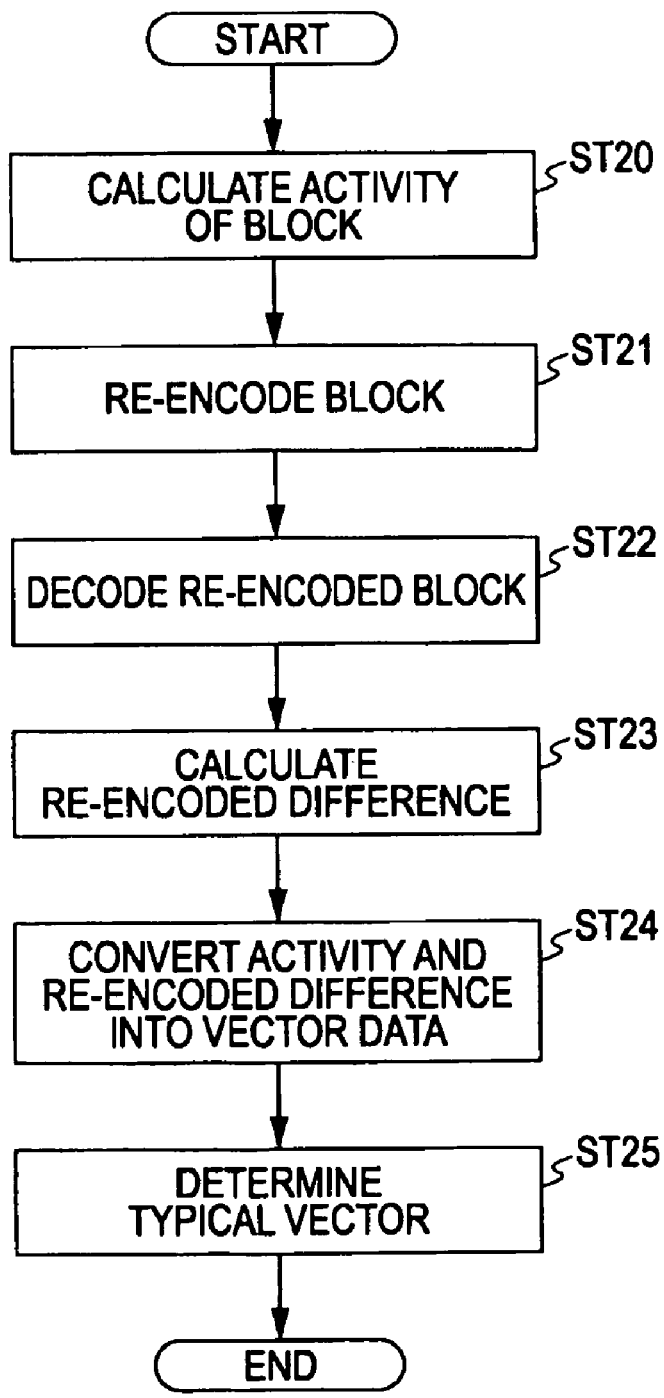
FIG. 28 is a flowchart that shows a method of determining a class code book in FIG. 27.

FIG. 28 is a flowchart that shows a method of determining a class code book in FIG. 27. In step ST20, an activity of a block is calculated. Next, in step ST21, the block is re-encoded. After that, in step ST22, the re-encoded data are decoded. Then, in step ST23, a difference between before and after re-encoding is calculated. Subsequently, in step ST24, the results of step ST20 and step ST23 are converted into vector data. Then, in step ST25, an arbitrary number of typical vectors are calculated by LBG algorithm from a distribution of pieces of vector data obtained in step ST24, and the calculated typical vectors are determined as a class code book.

Figure 29:
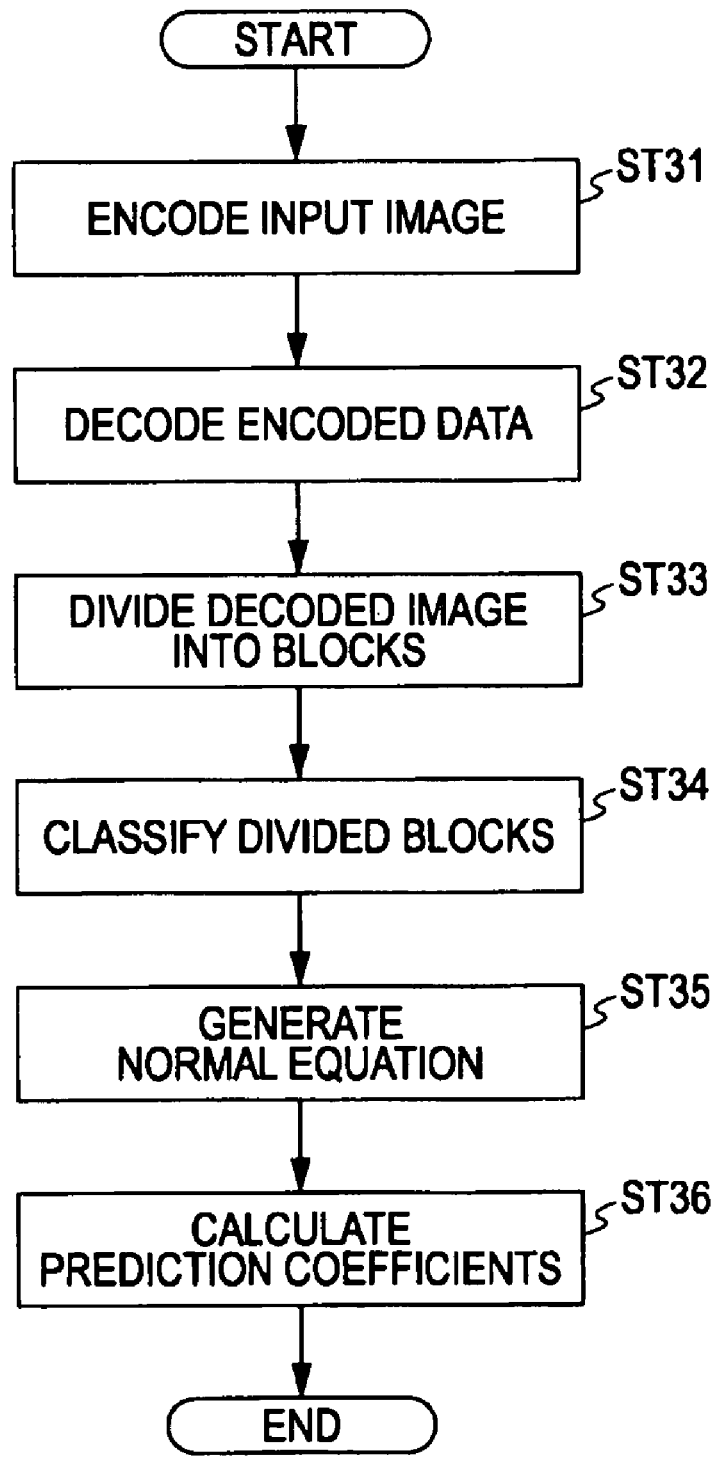
FIG. 29 is a flowchart that shows an example of generation of prediction coefficients.

FIG. 29 is a flowchart that shows an example of generation of prediction coefficients. In step ST31, an input image is encoded. Subsequently, in step ST32, the data encoded in step ST31 are decoded. Then, in step ST33, the image decoded in step ST32 is divided into blocks. After that, in step ST34, the divided blocks are classified. Then, in step ST35, a normal equation is generated for each class and each target pixel position in each block to calculate a prediction coefficient. After that, in step ST36, the normal equation is solved to calculate a prediction coefficient.

Figure 30:
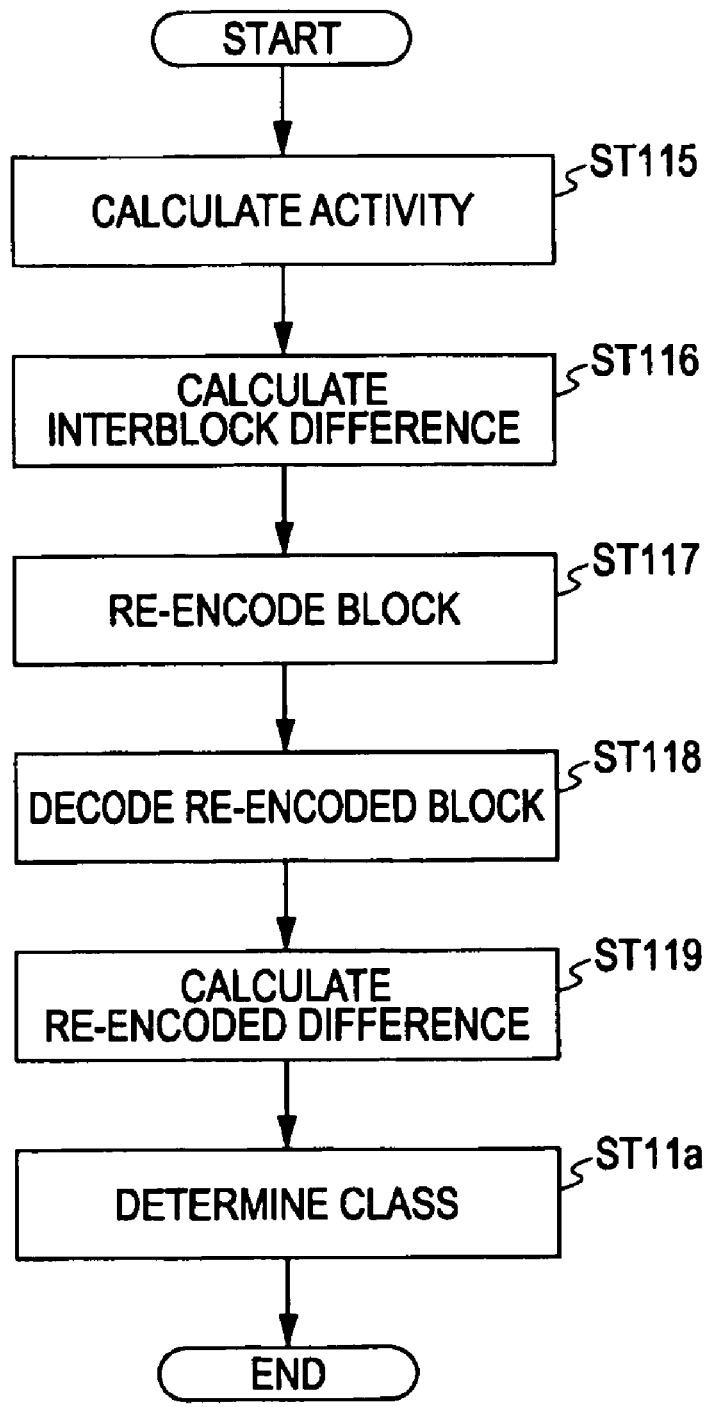
FIG. 30 is a flowchart that shows an example of an operation in a second configuration of classification in step ST11 in FIG. 25.

FIG. 30 is a flowchart in a second configuration of classification in step ST11 in FIG. 25. In step ST115, an activity of a block is calculated. Subsequently, in step ST116, a difference at an encoding block boundary of an input image is calculated. Next, in step ST117, the block is re-encoded. Then, in step ST118, the re-encoded data are decoded. After that, in step ST119, a difference between before and after re-encoding is calculated. Then, in step ST11a, a class is determined on the basis of the results of step ST115, step ST116 and step ST119. Note that the flowchart of class determination is similar to that of FIG. 27, the flowchart of determination of a class code book is similar to that of FIG. 28, and the number of dimensions handled in vector data is increased by one.

Figure 31:
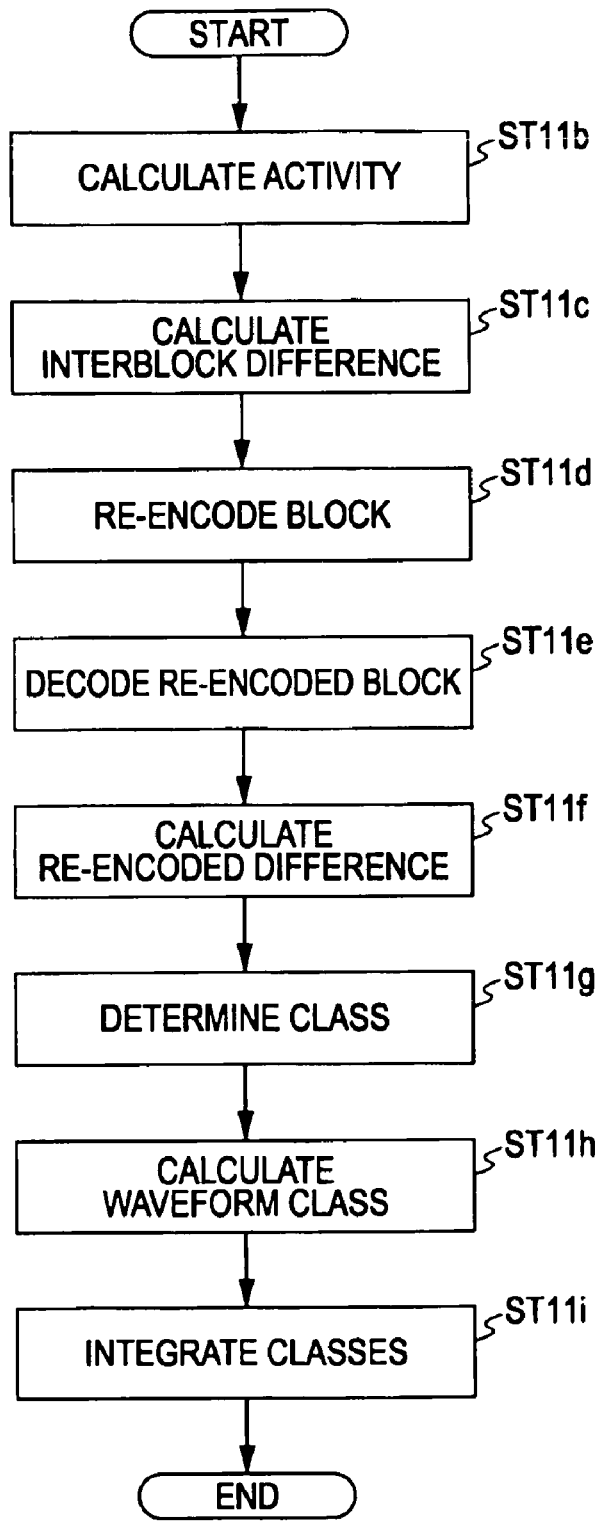
FIG. 31 is a flowchart that shows an example of an operation in a third configuration of classification in step ST11 in FIG. 25.

FIG. 31 is a flowchart in a third configuration of classification in step ST11 in FIG. 25. In step ST11b, an activity of a block is calculated. Next, in step ST11c, a difference at an encoding block boundary of an input image is calculated. Then, in step ST11d, the block is re-encoded. After that, in step ST11e, the re-encoded data are decoded. Subsequently, in step ST11f, a difference between before and after re-encoding is calculated. Then, in step ST11g, a class is determined on the basis of the results of step ST11b, step ST11c, and step ST11f. After that, in step ST11h, a waveform class at a target pixel is calculated. Then, in step ST11i, the classes determined in step ST11g and step ST11i are integrated and output as an ultimate class.

The present application contains subject matter related to that disclosed in Japanese Priority Patent Application JP 2008-132309 filed in the Japan Patent Office on May 20, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. An image signal processing apparatus comprising:
 a block division unit that inputs an image signal encoded by orthogonal transformation and that divides the encoded image signal into second blocks different from first blocks encoded using the orthogonal transformation;

an activity calculation unit that calculates an activity of each of the second blocks divided by the block division unit;

a re-encoding unit that encodes the second blocks divided by the block division unit using the orthogonal transformation;

a re-encoded difference calculation unit that calculates difference values between the second blocks re-encoded by the re-encoding unit and the first blocks encoded using the orthogonal transformation;

a class determination unit that determines a class of each of the second blocks on the basis of a distribution of the difference value calculated by the re-encoded difference calculation unit and the activity calculated by the activity calculation unit;

a prediction coefficient generating unit that generates a prediction coefficient corresponding to each of the classes determined by the class determination unit;

a prediction tap construction unit that constructs a prediction tap for calculating a target pixel in each of the second blocks; and a predictive operation unit that operates the prediction tap constructed by the prediction tap construction unit and the prediction coefficient generated by the prediction coefficient generating unit to calculate a pixel value of each of the target pixels.

2. The image signal processing apparatus according to claim 1, wherein the class determination unit includes:

a first vector data conversion unit that generates vector data formed of the difference value calculated by the re-encoded difference calculation unit and the activity calculated by the activity calculation unit;

a first class code storage unit that stores pieces of typical vector data, each of which represents the difference value calculated by the re-encoded difference calculation unit and the activity calculated by the activity calculation unit; and a first minimum value determination unit that determines typical vector data having a minimum norm to the vector data generated by the first vector data conversion unit from among the pieces of typical vector data stored in the first class code storage unit.

3. The image signal processing apparatus according to claim 1, further comprising:

an interblock difference calculation unit that calculates a difference value between predetermined pixels in the adjacent second blocks in regard to the plurality of second blocks divided by the block division unit, wherein the class determination unit determines a class of each of the second blocks on the basis of a distribution of the difference value calculated by the re-encoded difference calculation unit, the activity calculated by the activity calculation unit, and the difference value calculated by the interblock difference calculation unit.

4. The image signal processing apparatus according to claim 3, wherein the class determination unit includes:

a second vector data conversion unit that generates vector data formed of the difference value calculated by the re-encoded difference calculation unit, the activity calculated by the activity calculation unit and the difference value calculated by the interblock difference calculation unit;

a second class code storage unit that stores pieces of typical vector data, each of which represents a distribution of the difference value calculated by the re-encoded difference calculation unit, the activity calculated by the activity calculation unit and the difference value calculated by the interblock difference calculation unit; and a second minimum value determination unit that determines typical vector data having a minimum norm to the vector data generated by the second vector data conversion unit from among the pieces of typical vector data stored in the second class code storage unit.

5. The image signal processing apparatus according to claim 4, further comprising:

a waveform class calculation unit that calculates a class on the basis of a characteristic amount of a waveform in a target pixel and pixels around the target pixel in each of the second blocks; and a class integration unit that integrates the class determined by the class determination unit with the class determined by the waveform class calculation unit to determine a class, wherein the prediction coefficient generating unit generates a prediction coefficient corresponding to the class determined by the class integration unit.

6. An image signal processing method comprising the steps of:

dividing an image signal into first blocks and then encoding the image signal using orthogonal transformation;

dividing the encoded image signal into second blocks different from the first blocks;

calculating an activity of each of the divided second blocks;

re-encoding the second blocks using the orthogonal transformation;

calculating difference values between the re-encoded second blocks and the first blocks encoded using the orthogonal transformation;

determining a class of each of the second blocks on the basis of a distribution of the calculated difference value and the activity;

generating a prediction coefficient corresponding to the determined class;

constructing a prediction tap for calculating a target pixel in each of the second blocks; and operating the constructed prediction tap and the prediction coefficient to calculate a pixel value of the target pixel.

7. A non-transitory computer program product having computer readable instructions stored thereon that when executed by a computer causes the computer to execute an image signal processing method comprising:

dividing an image signal into first blocks and then encoding the image signal using orthogonal transformation; dividing the encoded image signal into second blocks different from the first blocks;

calculating an activity of each of the divided second blocks;

re-encoding the second blocks using the orthogonal transformation;

calculating difference values between the re-encoded second blocks and the first blocks encoded using the orthogonal transformation;

determining a class of each of the second blocks on the basis of a distribution of the calculated difference value and the activity;

generating a prediction coefficient corresponding to the determined class;

constructing a prediction tap for calculating a target pixel in each of the second blocks; and operating the constructed prediction tap and the prediction coefficient to calculate a pixel value of the target pixel.

8. A prediction coefficient generating apparatus comprising:
- an encoding unit that encodes an image signal divided into first blocks using orthogonal transformation;
- a decoding unit that decodes the image signal encoded by the encoding unit;
- a block division unit that inputs the image signal decoded using the orthogonal transformation and that divides the encoded image signal into second blocks different from the first blocks encoded using the orthogonal transformation;
- an activity calculation unit that calculates an activity of each of the second blocks divided by the block division unit;
- a re-encoding unit that encodes the second blocks divided by the block division unit using the orthogonal transformation;
- a re-encoded difference calculation unit that calculates difference values between the second blocks re-encoded by the re-encoding unit and the first blocks encoded using the orthogonal transformation;
- a class determination unit that determines a class of each of the second blocks on the basis of a distribution of the difference value calculated by the re-encoded difference calculation unit and the activity calculated by the activity calculation unit;
- a prediction tap construction unit that constructs a prediction tap for calculating a target pixel in each of the second blocks; and
- a prediction coefficient operation unit that, for each position of a target pixel of each second block in the class, calculates a prediction coefficient that minimizes a difference between a pixel value of the target pixel and a pixel value of the corresponding first block on the basis of the class determined by the class determination unit, the prediction tap constructed by the prediction tap construction unit and pixels of the image signal divided into that first block.

9. A prediction coefficient generating method comprising the steps of:
- dividing an image signal into first blocks and then encoding the image signal using orthogonal transformation;
- decoding the encoded image signal;
- inputting the image signal encoded using the orthogonal transformation and dividing the encoded image signal into second blocks different from the first blocks;
- calculating an activity of each of the divided second blocks;
- re-encoding the second blocks using the orthogonal transformation;
- calculating difference values between the re-encoded second blocks and the first blocks encoded using the orthogonal transformation;
- determining a class of each of the second blocks on the basis of a distribution of the calculated difference value and the activity;
- constructing a prediction tap for calculating a target pixel in each of the second blocks;
- for each position of the target pixel of each second block in the class, calculating a prediction coefficient that minimizes a difference between a pixel value of the target pixel and a pixel value of the corresponding first block on the basis of the class, the prediction tap and pixels of the image signal divided into that first block.

10. A non-transitory computer program product having computer readable instructions stored thereon that when executed by a computer causes the computer to execute a prediction coefficient generating method comprising:
- dividing an image signal into first blocks and then encoding the image signal using orthogonal transformation;
- decoding the encoded image signal;
- inputting the image signal encoded using the orthogonal transformation and dividing the encoded image signal into second blocks different from the first blocks;
- calculating an activity of each of the divided second blocks;
- re-encoding the second blocks using the orthogonal transformation;
- calculating difference values between the re-encoded second blocks and the first blocks encoded using the orthogonal transformation;
- determining a class of each of the second blocks on the basis of a distribution of the calculated difference value and the activity;
- constructing a prediction tap for calculating a target pixel in each of the second blocks;
- for each position of the target pixel of each second block in the class, calculating a prediction coefficient that minimizes a difference between a pixel value of the target pixel and a pixel value of the corresponding first block on the basis of the class, the prediction tap and pixels of the image signal divided into that first block.

* * * * *